United States Patent
Dudar

(10) Patent No.: US 9,732,685 B2
(45) Date of Patent: Aug. 15, 2017

(54) SYSTEM AND METHODS FOR PREVENTING PREMATURE REFUELING SHUTOFF

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 14/938,565

(22) Filed: Nov. 11, 2015

(65) Prior Publication Data

US 2017/0130659 A1   May 11, 2017

(51) Int. Cl.
  *F02M 25/08* (2006.01)
  *F02D 41/00* (2006.01)
  *B60K 15/035* (2006.01)

(52) U.S. Cl.
  CPC ......... *F02D 41/0032* (2013.01); *F02M 25/08* (2013.01); *F02M 25/0836* (2013.01); *B60K 15/035* (2013.01)

(58) Field of Classification Search
  CPC  F02D 41/0032; F02M 25/08; F02M 25/0836; B60K 15/035
  USPC ............................. 123/516, 518–520, 198 D
  See application file for complete search history.

(56) References Cited

U.S. PATENT DOCUMENTS

| | | | |
|---|---|---|---|
| 5,806,500 A * | 9/1998 | Fargo | F02M 25/089 123/198 D |
| 7,762,241 B2 | 7/2010 | Childress et al. | |
| 8,075,677 B2 | 12/2011 | Schroeder et al. | |
| 8,191,536 B2 | 6/2012 | Devries et al. | |
| 2015/0090233 A1 | 4/2015 | Dudar et al. | |

* cited by examiner

*Primary Examiner* — Mahmoud Gimie
(74) *Attorney, Agent, or Firm* — James Dottavio; McCoy Russell LLP

(57) ABSTRACT

Methods and systems are provided for conducting a refueling operation. In one example, during the refueling event, fuel vapors may be routed from a fuel tank to a first fuel vapor canister, and upon indication that the first fuel vapor canister is saturated with hydrocarbons, fuel vapors may be routed from the fuel tank to a second fuel vapor canister thus bypassing the first fuel vapor canister, without input from a powertrain control module. In this way, during refueling, saturated fuel vapor canisters are bypassed such that resistance to fuel vapor flow may be decreased, thus reducing the likelihood of premature shutoffs of a refueling dispenser.

20 Claims, 8 Drawing Sheets

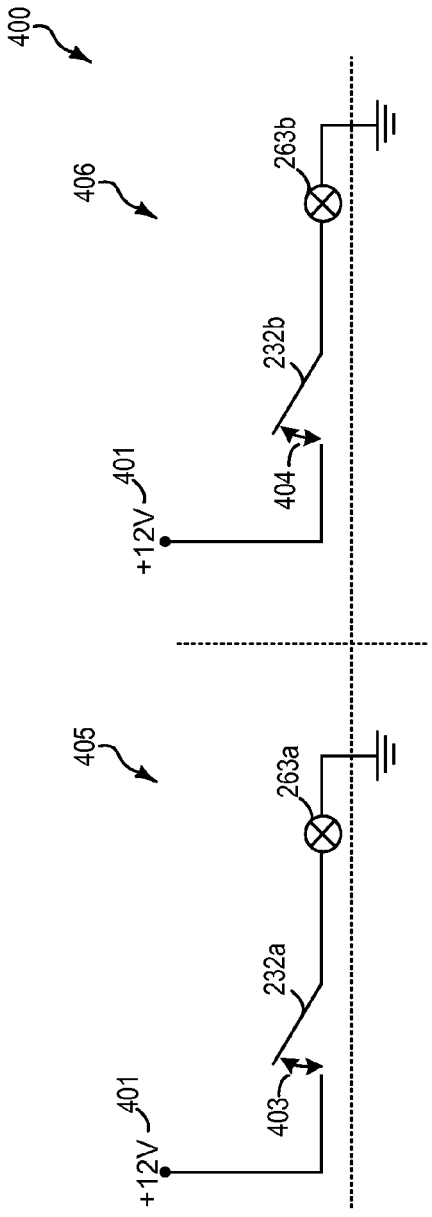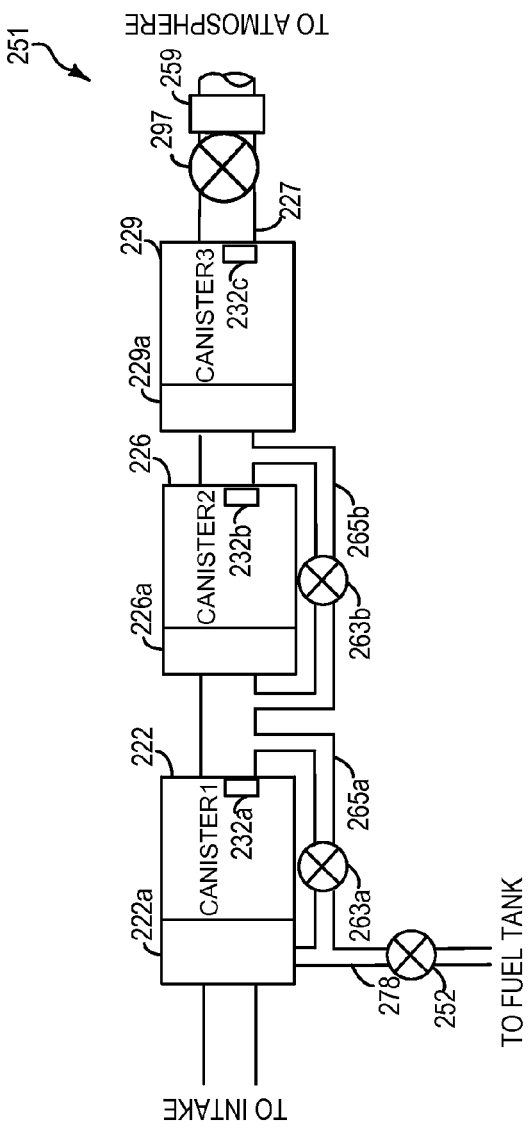
FIG. 4A
FIG. 4B

SYSTEM AND METHODS FOR PREVENTING PREMATURE REFUELING SHUTOFF

FIELD

The present description relates generally to methods and systems for controlling a vehicle engine to bypass loaded fuel vapor canisters during refueling events.

BACKGROUND/SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

During a refueling event, fuel vapor located in the fuel tank may be diverted to the fuel vapor canister by opening a fuel tank isolation valve prior to the addition of fuel to the fuel tank. Fuel vapors generated during refueling may also be diverted to the fuel vapor canister in this way. Air that is stripped of fuel vapor may be diverted from the fuel vapor canister to atmosphere via a vent line, which may include a vent valve, air filter, etc.

However, restrictions, such as blockages or stuck valves may impede the movement of fuel vapor or air through the evaporative emissions system. In some scenarios, the restrictions may result in the premature termination of a refueling event. As there are numerous potential restriction points within the evaporative emissions system, the cause of premature refueling shutoff is often not apparent. Indeed, the most common solution is a complete dismantling of the evaporative emissions system, which may be time consuming and expensive.

In one example, the fuel vapor canister itself may act as a restriction to the movement of fuel vapor or air through the evaporative emissions system, depending on the loading state of the canister. More specifically, a fully loaded canister may substantially restrict the movement of fuel vapor or air through the canister, as compared to a clean canister. As evaporative emissions standards increasingly become stricter, in some cases it may be necessary to configure a plurality of canisters in series. As such, as the canisters in series become loaded with fuel vapor, the flow of fuel vapor or air through the canister may become increasingly restricted. Accordingly, during a refueling event the increased restriction to fuel vapor flow due to one or more saturated fuel vapor canisters may lead to premature shutoffs. The inventors herein have recognized the above issues.

Toward this end, U.S. Pat. No. 8,191,536 B2 teaches fuel vapor canisters in series, in which the fuel vapors may be supplied to each canister via separate flow paths, thereby providing independent control of the loading of each canister. However, U.S. Pat. No. 8,191,536 B2 teaches during a refueling operation, loading the canisters in series, while during engine-off conditions for which a refueling operation is not indicated, directing the flow of fuel vapors around a first canister to a second canister. As such, the inventors have herein also recognized potential issues with such a method. For example, as described above, during a refueling operation as the canisters become loaded with fuel vapor, the flow of fuel vapor or air through the canisters may become increasingly restricted, leading to premature shutoffs, and U.S. Pat. No. 8,191,536 B2 does not teach actions to mitigate the possibility of increased restriction during refueling operations. Furthermore, U.S. Pat. No. 8,191,536 B2 does not teach directing fuel vapors to separate fuel vapor canisters depending on the loading state of the canisters. Additionally, the directing of fuel vapors to separate fuel vapor canisters as taught by U.S. Pat. No. 8,191,536 B2 is based on the actuation of valves under control of the vehicle powertrain control module, thus increasing costs and complexity of the directing of fuel vapors to separate fuel vapor canisters.

Thus, the inventors herein have developed systems and methods to at least partially address the above issues. In one example, a method is provided comprising, during refueling a fuel tank which supplies fuel to a combustion engine, venting the fuel tank to atmosphere through a vapor storage system (evaporative emissions control system) comprising a first fuel vapor canister and a second fuel vapor canister arranged in series, each comprising a load port and a vent port, and wherein the first fuel vapor canister additionally comprises a purge port; routing vapors from the fuel tank to the load port of the first fuel vapor canister, and responsive to an indication that the first fuel vapor canister is saturated with fuel vapors, routing the vapors from the fuel tank around the first fuel vapor canister to the load port of the second fuel vapor canister.

In one example, a temperature of the first fuel vapor canister may be monitored via a first thermistor positioned at the vent port of the first fuel vapor canister, wherein the indication that the first fuel vapor canister is saturated with fuel vapors includes the temperature of the first fuel vapor canister above a predetermined threshold. Responsive to the temperature of the first fuel vapor canister above the predetermined threshold, a circuit powered by an on-board power supply may be completed based on a temperature dependent change in the resistance of the circuit, wherein completion of the circuit opens a first bypass valve housed within a first bypass conduit running parallel to the first fuel vapor canister such that fuel tank vapors may be routed around the first fuel vapor canister to the second fuel vapor canister. In this way, saturated fuel vapor canisters may be bypassed during a refueling event without powertrain control module input, thus decreasing resistance to the flow of fuel vapor and air through the evaporative emissions system and preventing premature shutoffs of a refueling dispenser due to saturated fuel vapor canisters.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4A schematically shows example circuitry controlling a first bypass valve and a second bypass valve.

FIG. 4B schematically shows an example evaporative emissions system with three fuel vapor canisters and two bypass valves, corresponding to the bypass valves in FIG. 4A.

DETAILED DESCRIPTION

Figure 5:
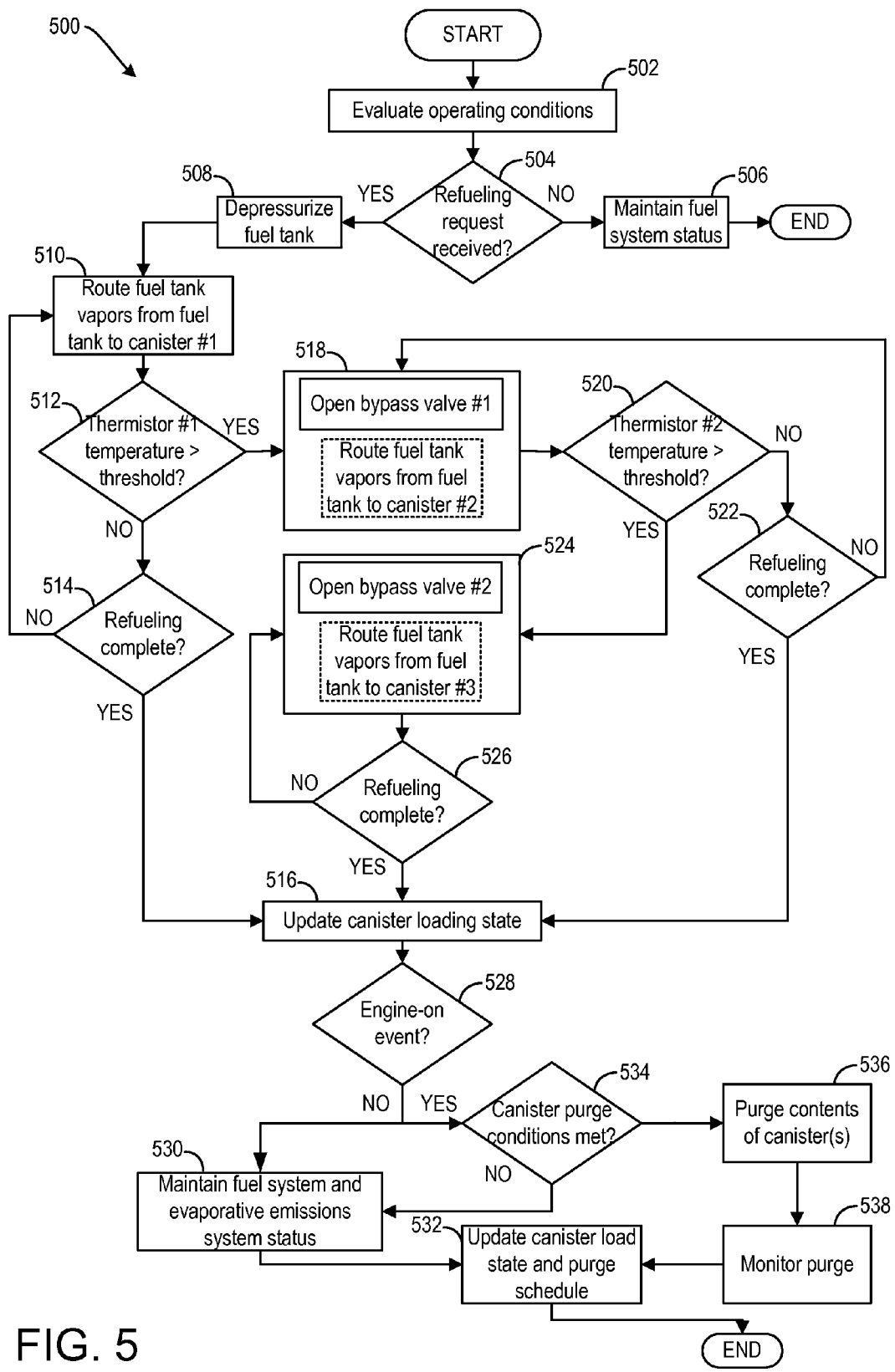
FIG. 5 shows an example method for a refueling operation and a purging operation, parts of which are carried out by a controller.
Figure 6:
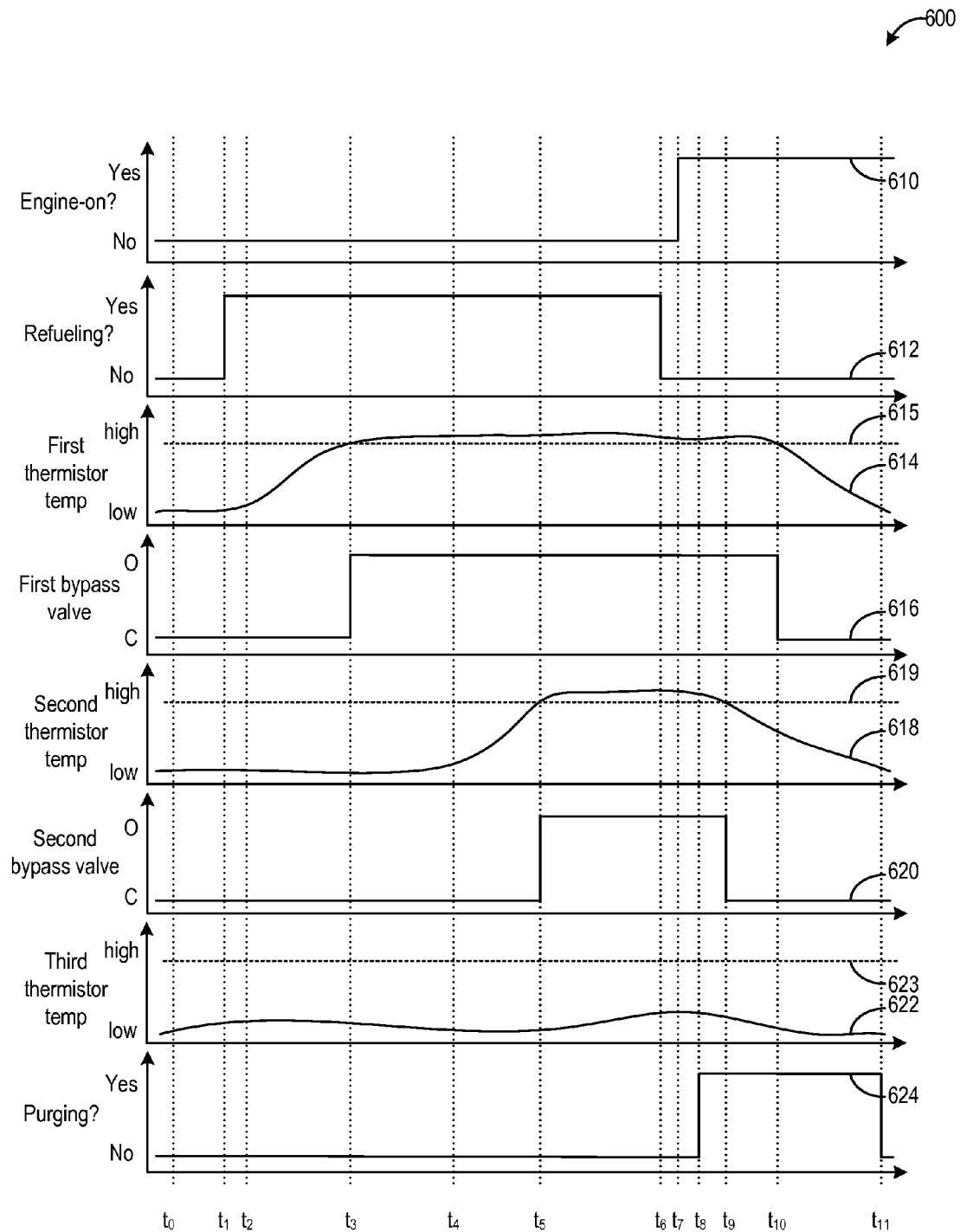
FIG. 6 shows a timeline for an example refueling operation and purging operation according to the method of FIG. 5.
Figure 7:
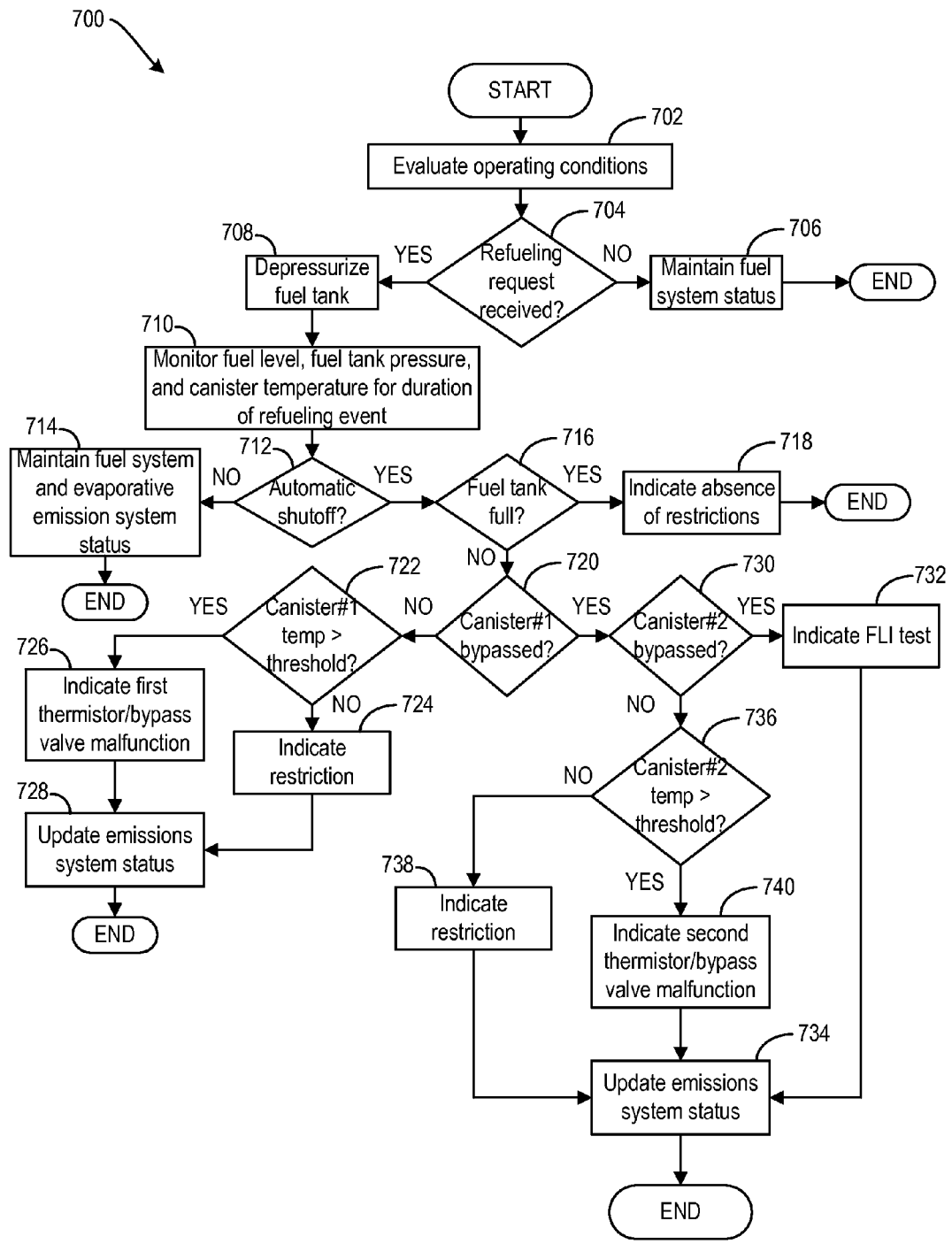
FIG. 7 shows an example method for indicating restrictions in an evaporative emissions system, or a malfunctioning fuel level indicator, responsive to a refueling event.
Figure 8:
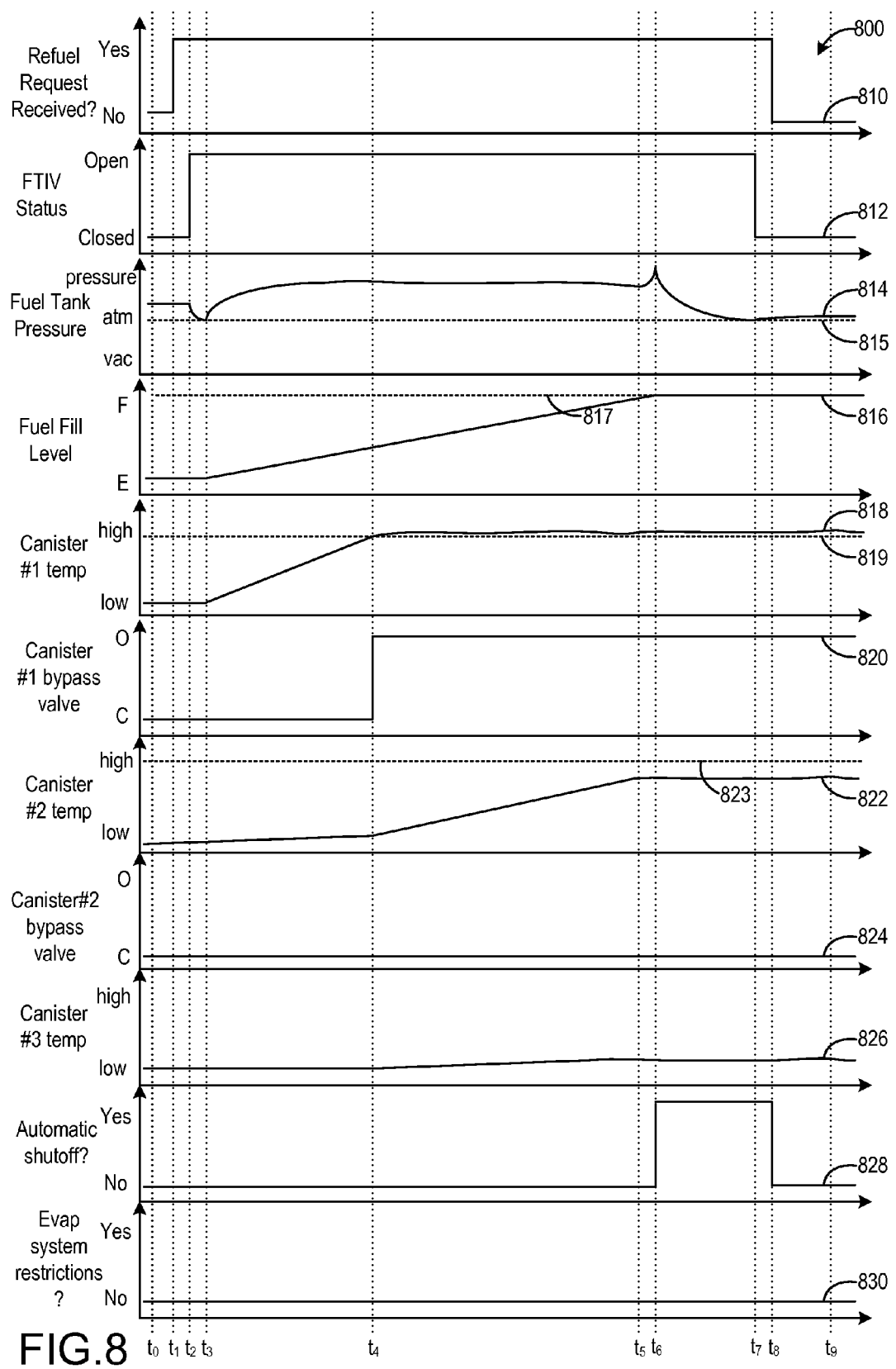
FIG. 8 shows an example timeline for indicating restrictions in an evaporative emissions system responsive to a refueling event, according to the method of FIG. 7.

This detailed description relates to systems and methods for controlling a vehicle engine to bypass loaded fuel vapor canisters during refueling events. Specifically, the description relates to indicating a request for a refueling operation, commanding open a fuel tank isolation valve to route fuel tank vapors to a first fuel vapor canister, and, responsive to an indication that the first fuel vapor canister is saturated, routing the fuel tank vapors around the first fuel vapor canister to a second fuel vapor canister. In some examples, any number of canisters may be arranged in series and configured such that, responsive to an indication that any number of the canisters are saturated, the fuel tank vapors may be routed around the saturated canisters, thereby directing fuel tank vapors to a clean fuel vapor canister. The system and methods may be applied to a vehicle system, such as the hybrid vehicle system depicted in FIG. 1, though it should be understood that the systems and methods described herein are not limited to hybrid vehicle systems, but may be applied to any vehicle system comprising a fuel system and an evaporative emissions system. For example, the systems and methods described herein may be applied to any vehicle with a fuel system coupled to an evaporative emissions system, as described in detail with regard to FIG. 2, and wherein the evaporative emissions system may include a plurality of fuel vapor canisters and bypass valves configured to route fuel vapors around saturated fuel vapor canisters. During a refueling event, fuel tank vapors may be routed from the fuel tank to a first fuel vapor canister, under conditions wherein the first fuel vapor canister is not saturated with hydrocarbons, as illustrated in FIG. 3A. Alternatively, upon an indication that the first fuel tank vapor canister is saturated with hydrocarbons, a first bypass valve may be opened and fuel tank vapors may be routed around the first fuel vapor canister to the second fuel vapor canister, as illustrated in FIG. 3B. In an example case where three canisters are arranged in series, and wherein a first fuel vapor canister and a second fuel vapor canister are indicated to be saturated with hydrocarbons, the first fuel vapor canister and the second fuel vapor canister may be bypassed, thus routing fuel tank vapors to the third fuel vapor canister, as illustrated in FIG. 3C. Subsequent to loading of the plurality of fuel vapor canisters, an intake manifold vacuum may be applied to the evaporative emissions system in order to purge the fuel vapor canisters of adsorbed hydrocarbons to engine intake, as illustrated in FIG. 3D. The opening of one or more bypass valves may be controlled via a plurality of temperature dependent thermistors, each configured to complete a circuit responsive to a temperature increase above a threshold, wherein the completion of each circuit triggers the opening of a bypass valve, as illustrated in FIG. 4A, and wherein the temperature increase above the threshold indicates a saturated fuel vapor canister. The plurality of temperature dependent thermistors may each be housed within the plurality of fuel vapor canisters, at a vent port of each fuel vapor canister, as illustrated in FIG. 4B. A method for performing a refueling operation and a subsequent purging operation, parts of which are controlled by a powertrain control module controller, and according to the systems described in FIGS. 1-4B, is depicted in FIG. 5. A timeline for the refueling and purging operations, parts of which are controlled by the powertrain control module controller using the method of FIG. 5 is shown in FIG. 6. Responsive to a refueling event, a method for indicating restrictions in an evaporative emissions system, or a malfunctioning fuel level indicator, responsive to a refueling event, is illustrated in FIG. 7. A timeline for indicating restrictions in an evaporative emissions system, responsive to a refueling event, using the method of FIG. 7 is shown in FIG. 8.

Figure 1:
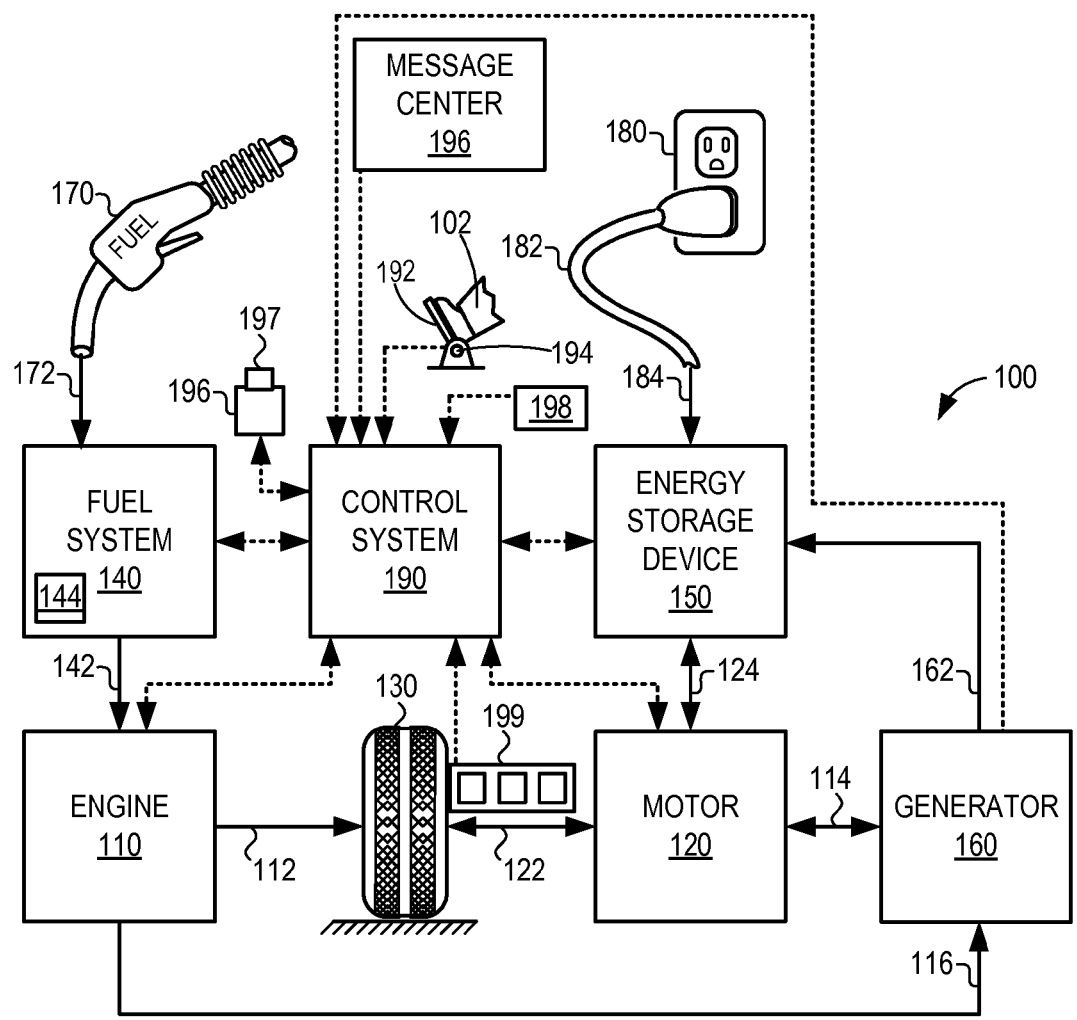
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Figure 2:
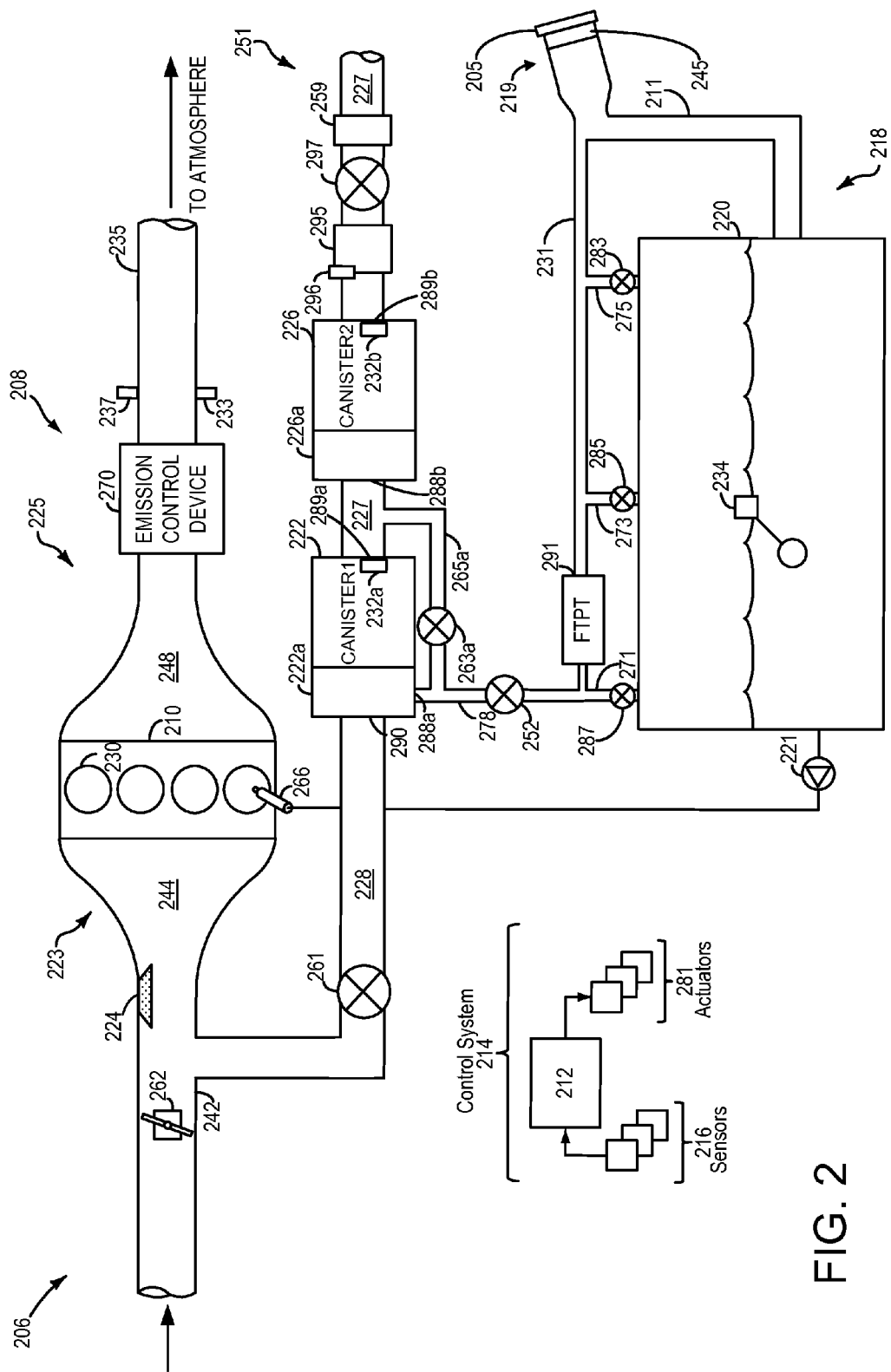
FIG. 2 schematically shows an example vehicle system with a fuel system and an evaporative emissions system.
Figure 3A:
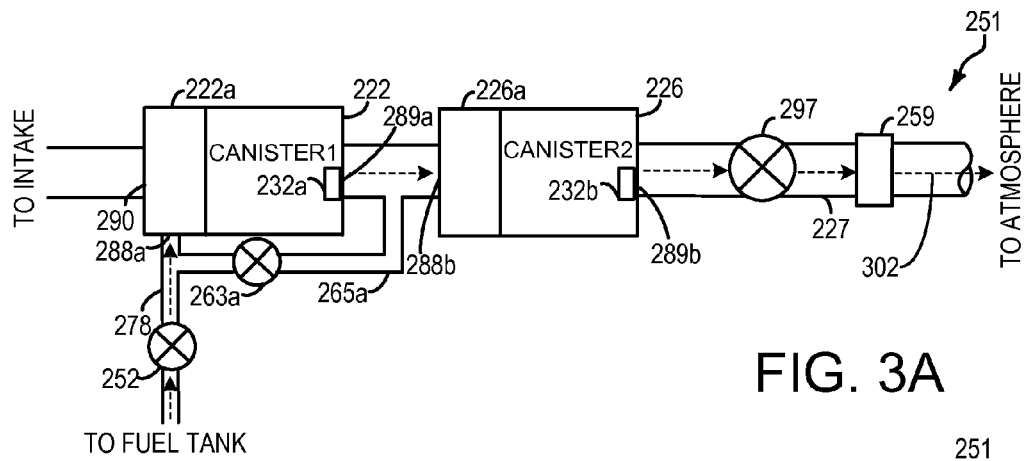
FIG. 3A schematically shows an example evaporative emissions system during a refueling operation with two fuel vapor canisters arranged in series and a first bypass valve closed.
Figure 3B:
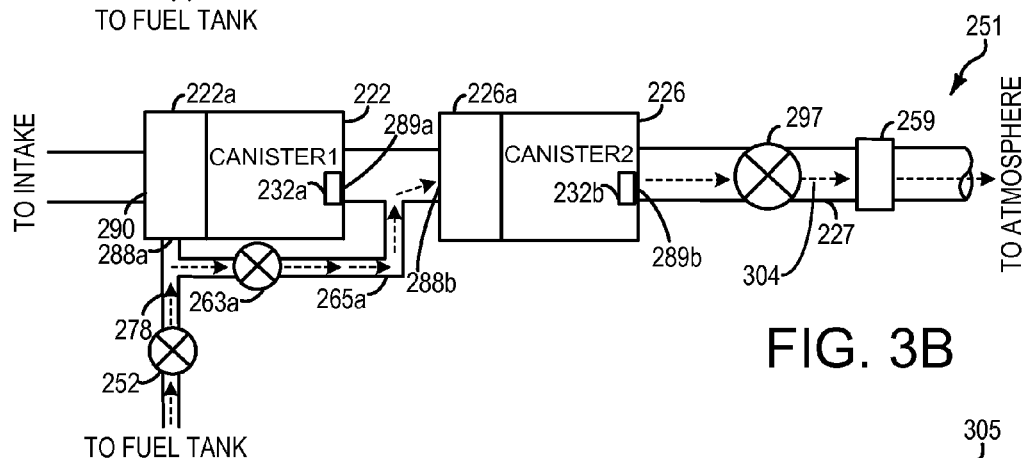
FIG. 3B schematically shows an example evaporative emissions system during a refueling operation with two fuel vapor canisters arranged in series and a first bypass valve opened.
Figure 3C:
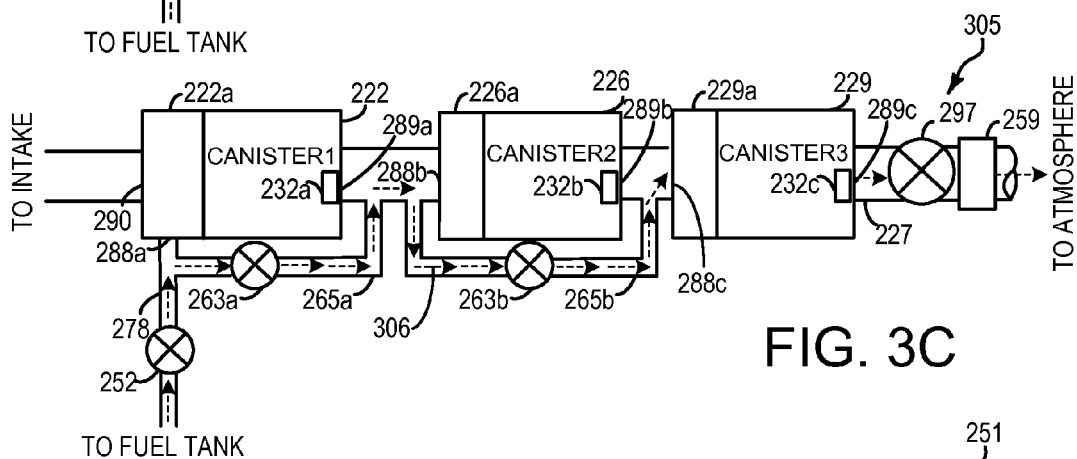
FIG. 3C schematically shows an example evaporative emissions system during a refueling operation with three fuel vapor canisters arranged in series, and with a first bypass valve and a second bypass valve opened.
Figure 3D:
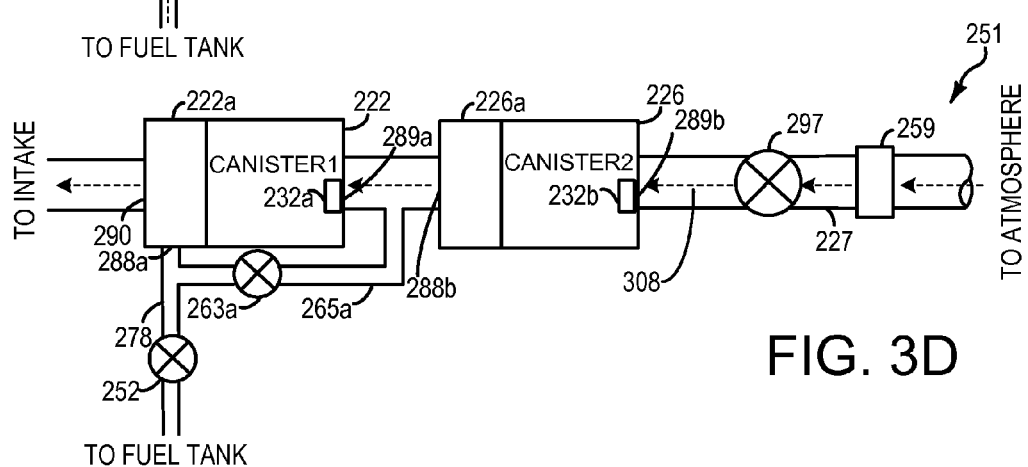
FIG. 3D schematically shows an example evaporative emissions system during a purging operation with two fuel vapor canisters arranged in series and a first bypass valve closed.

FIG. 2 shows a schematic depiction of a vehicle system 206. The vehicle system 206 includes an engine system 208 coupled to an emissions control system 251 and a fuel system 218. Emission control system 251 includes a plurality of fuel vapor containers or canisters (e.g., first fuel vapor canister 222 and second fuel vapor canister 226) which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes one or more fuel vapor canisters (e.g., first fuel vapor canister 222 and second fuel vapor canister 226) via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters (e.g., first fuel vapor canister 222; second fuel vapor canister 226), each filled with an appropriate adsorbent. A first fuel vapor canister (e.g., 222) may include a load port 288a, a vent port 289a, and a purge port 290. A second fuel vapor canister (e.g., 226) man include a load/purge port 288b, and a vent port 289b. The canisters may be configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the one or more canisters (e.g., first vapor canister 222; second fuel vapor canister 226) to the atmosphere when storing, or trapping, fuel vapors from fuel system 218. In some examples, described in detail herein, emissions control system 251 may include one or more bypass conduits, for example a first bypass conduit 265a, wherein a first bypass valve 263a may be configured such that, when open, fuel tank vapors may be routed around the first fuel vapor canister 222 to the second fuel vapor canister 226. In other words, the first bypass valve may be configured to couple and uncouple the routing of fuel tank vapors to the second fuel vapor canister. The first bypass conduit 265a may be couple at one end to a fuel vapor conduit 278, and may couple at the other end to vent line 227 (e.g., first segment of vent line 227) at a point between first fuel vapor canister 222 and second fuel vapor canister 226. In one example, the opening of the first bypass valve 263a may be controlled by a temperature dependent thermistor, for example a first thermistor 232a, configured to complete a circuit responsive to a threshold temperature being attained, and wherein the circuit being completed may be based on a temperature dependent change in the resistance of the circuit. As such, the first bypass valve 263a may be opened responsive to an indicated temperature above a threshold, and closed responsive to an indicated temperature below a threshold, wherein the opening and closing of the first bypass vale 263a may be achieved passively without powertrain control module input. As fuel vapor is adsorbed by the adsorbent in the canister, heat is generated (heat of adsorption), and likewise, as fuel vapor is desorbed by the adsorbent in the canister, heat is consumed. Thus the adsorption and desorption of fuel vapor by the canister may be monitored and estimated based on temperature changes within the canister, wherein a temperature increase above a threshold may indicate a fuel vapor canister saturated with hydrocarbons.

In some examples, a second thermistor 232b may be included in the second fuel vapor canister 226, wherein the second thermistor 232b may be configured to indicate a canister load based on the temperature of the second fuel vapor canister 226 at the thermistor 232b, but wherein a temperature increase above a threshold does not complete a circuit to close a bypass valve, as no bypass conduit (or bypass valve) may be configured around the second fuel vapor canister 226. In addition, first thermistor 232a, configured to open bypass valve 263a responsive to a temperature increase above a threshold, may further be configured to indicate a canister load of the first fuel vapor canister 222 based on the temperature of the first fuel vapor canister 222 at the first thermistor 232a. As such, thermistors may be configured to both complete a circuit responsive to a temperature increase above a threshold such that a bypass valve is opened, and/or indicate a canister load based on the temperature of the vapor canister at the indicated thermistor.

In alternate examples, one or more temperature sensors in addition to or alternative to the canister thermistor may be configured to indicate temperature of the vapor canister in one or more locations, such that canister load may be accurately indicated. While two fuel vapor canisters are depicted in FIG. 2 (first fuel vapor canister 222 and second fuel vapor canister 226), along with a first thermistor 232a, a second thermistor 232b, a first bypass conduit 265a, and a first bypass valve 263a, it may be appreciated that any number of fuel vapor canisters may be arranged in series, in similar fashion, as will be elaborated in greater detail herein.

First fuel vapor canister 222 and second fuel vapor canister 226 may include a first buffer 222a, and a second buffer 226a (or buffer region), each of the canister and the buffer comprising the adsorbent. As shown, the volume of buffer (e.g., 222a, 226a) may be smaller than (e.g., a fraction of) the volume of the fuel vapor canister (e.g., 222, 226). The adsorbent in the buffer (e.g., 222a, 226a) may be same as, or different from, the adsorbent in the canister (e.g., both may include charcoal). The buffer(s) may be positioned within the one or more canisters such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Vent line 227 may also allow fresh air to be drawn into first fuel vapor canister 222 and second fuel vapor canister 226 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the one or more fuel vapor canister(s) for purging. In some examples, vent line 227 may include an air filter 259 disposed therein upstream of second fuel vapor canister 226.

In some examples, the flow of air and vapors between first fuel vapor canister 222, second fuel vapor canister 226, and the atmosphere may be regulated by a canister vent valve 297 coupled within vent line 227 (e.g., within a second segment of vent line 227). When included, the canister vent valve may be a normally open valve, so that a fuel tank isolation valve 252 (FTIV), when included, may control venting of fuel tank 220 with the atmosphere. FTIV 252, when included, may be positioned between the fuel tank and the fuel vapor canister within fuel vapor conduit 278. FTIV 252 may be a normally closed valve, that when opened, allows for the venting of fuel vapors from fuel tank 220 to first fuel vapor canister 222, or, as described further herein, routing of fuel vapors around first fuel vapor canister 222 to second fuel vapor canister 226. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252, when included, while closing canister purge valve (CPV) 261 to direct refueling vapors into the one or more fuel vapor canisters (e.g., first fuel vapor canister 222, second fuel vapor canister 226) while preventing fuel vapors from being directed into the intake manifold.

As another example, the fuel system may be operated in a refueling mode (e.g., when fuel tank refueling is requested by a vehicle operator), wherein the controller 212 may open isolation valve 252, when included, while maintaining canister purge valve 261 closed, to depressurize the fuel tank before allowing enabling fuel to be added therein. As such, isolation valve 252, when included, may be kept open during the refueling operation to allow refueling vapors to be stored in the one or more fuel vapor canisters (e.g., first fuel vapor canister 222, second fuel vapor canister 226). After refueling is completed, the fuel tank isolation valve 252, when included, may be closed.

As yet another example, the fuel system may be operated in a canister purging mode (e.g., after an emission control device light-off temperature has been attained and with the engine running), wherein the controller 212 may open canister purge valve 261 while closing isolation valve 252 (when included). Herein, the vacuum generated by the intake manifold of the operating engine may be used to draw fresh air through vent 227 and through first fuel vapor canister 222 and second fuel vapor canister 226 to purge the stored fuel vapors into intake manifold 244. In other words, air flow may be directed through the second fuel vapor canister and the first fuel vapor canister, out of the purge port of the first fuel vapor canister to the engine intake manifold to purge fuel vapors stored in the first fuel vapor canister and the second fuel vapor canister to the engine intake manifold. In this mode, the purged fuel vapors from the one or more fuel vapor canisters are combusted in the engine. The purging may be continued until the stored fuel vapor amount in the one or more fuel vapor canisters is below a threshold. For example, as described above, first thermistor 232a and second thermistor 232b may be configured to indicate canister loading state based on the temperature of the respective fuel vapor canister as measured by the thermistor. As such, the duration and aggressiveness (wherein aggressiveness may be defined as a rate and extent of throttle opening during purging) of purging operations may be controlled based on an indicated canister load as monitored by the first thermistor 232a and second thermistor 232b. As described above, in alternate examples, additional or alternative temperature sensors may be included in the one or more fuel vapor canisters in order to monitor canister loading state.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291 (fuel tank pressure transducer 291), and first thermistor 232a and second thermistor 232b. Other sensors such as pressure, temperature, air/fuel ratio, and composition sensors may be coupled to various locations in the vehicle system 206. As another example, the actuators may include throttle 262, fuel tank isolation valve 252 (when included), canister purge valve 261, and canister vent valve 297. The controller 212 may receive input data from the various sensors, process the input data, and trigger the actuators in response to the processed input data based on instruction or code programmed therein corresponding to one or more routines. An example method is described herein with regard to FIG. 5 wherein parts of the method are controlled by a controller. Another example control routine is described herein with regard to FIG. 7.

In some examples, the controller 212 may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Undesired evaporative emissions detection routines may be intermittently performed by controller 212 on fuel system 218 and evaporative emissions control system 251 to confirm that the fuel system and/or evaporative emissions control system is not compromised. As such, evaporative emissions detection routines may be performed while the engine is off (engine-off evaporative emissions test) using engine-off natural vacuum (EONV) generated due to a change in temperature and pressure at the fuel tank following engine shutdown and/or with vacuum supplemented from a vacuum pump. Alternatively, undesired evaporative emissions detection routines may be performed while the engine is running by operating a vacuum pump and/or using engine intake manifold vacuum. Evaporative emissions tests may be performed by an evaporative emissions check module 295 communicatively coupled to controller 212. Evaporative emissions check module 295 may be coupled in vent 227 (e.g., second vent line segment), between the one or more fuel vapor canisters (e.g., fuel vapor canister 222, fuel vapor canister 226) and atmosphere. Evaporative emissions check module 295 may include a vacuum pump for applying negative pressure to the fuel system and/or evaporative emissions control system when administering an evaporative emissions test. In some embodiments, the vacuum pump may be configured to be reversible. In other words, the vacuum pump may be configured to apply either a negative pressure or a positive pressure on the fuel system and/or evaporative emissions control system. Evaporative emissions check module 295 may further include a reference orifice and a pressure sensor 296. Following the applying of vacuum to the fuel system and/or evaporative emissions control system, a change in pressure at the reference orifice (e.g., an absolute change or a rate of change) may be monitored and compared to a threshold. Based on the comparison, undesired evaporative emissions in the fuel system and/or evaporative emissions control system may be diagnosed.

In some configurations, a canister vent valve (CVV) 297 may be coupled within vent line 227. CVV 297 may function to adjust a flow of air and vapors between the one or more fuel vapor canisters and the atmosphere. The CVV may also be used for diagnostic routines. When included, the CVV may be opened during fuel vapor storing operations (for example, during fuel tank refueling and while the engine is not running) so that air, stripped of fuel vapor after having passed through the one or more fuel vapor canisters, can be pushed out to the atmosphere. Likewise, during purging operations (for example, during canister regeneration and while the engine is running), the CVV may be opened to allow a flow of fresh air to strip the fuel vapors stored in the one or more fuel vapor canisters. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In one example, the CVV may be closed while the vehicle is off, thus maintaining battery power while maintaining the fuel emissions control system sealed from atmosphere, however in other examples the CVV may be opened during vehicle-off conditions.

Now turning to FIGS. 3A-3D, example illustrations of an evaporative emissions control system as described above with regard to FIG. 2 are shown in detail under various conditions. In all example illustrations FIGS. 3A-3D, components that are the same as those illustrated in FIG. 2 are denoted by the same reference number. Furthermore, in all example illustrations FIGS. 3A-3D, evaporative emissions check module (e.g., 295) is not shown for clarity, however it should be understood that any one or all of the example illustrations FIGS. 3A-3D may include an evaporative emissions check module without departing from the scope of the present disclosure. Additionally, in all example illustrations FIGS. 3A-3D, a fuel tank isolation valve is included, however it should be understood that any one or all of the example illustrations (FIGS. 3A-3D), a fuel tank isolation valve may not be included without departing from the scope of the present disclosure.

FIG. 3A schematically illustrates an evaporative emissions control system 251. Emissions control system includes a first fuel vapor canister 222, and a second fuel vapor canister 226 in series. First fuel vapor canister 222 includes a first thermistor 232a positioned near a vent port (e.g., 289a) of the first fuel vapor canister 222, wherein the vent port of first fuel vapor canister 222 is coupled to the load port (e.g., 288b) of canister 226 via vent line 227 (e.g., first vent line segment). First thermistor 232a may be configured to indicate a first fuel vapor canister 222 loading state based on the temperature of the first fuel vapor canister as sensed by the first thermistor 232a. Furthermore, first thermistor 232a may be configured such that, upon a temperature increase above a threshold, a circuit may be completed based on a temperature dependent change in the resistance of the circuit, thereby opening a first bypass valve 263a coupled within first bypass conduit 265a. As such, responsive to the temperature increase above the threshold as sensed by first thermistor 232a, first bypass valve 263a may be opened without powertrain control module input. A second thermistor 232b may be further configured to indicate a second fuel vapor canister 226 loading state, but may not be configured to complete a circuit responsive to a sensed temperature increase above a threshold as the evaporative emissions control system 251 illustrated in FIG. 3A does not include a second bypass conduit (or second bypass valve).

Responsive to a refueling request, a fuel tank isolation valve 252, when included, may be commanded open to depressurize the fuel tank, and canister vent valve 297 may be commanded open or maintained open. Subsequent to fuel tank depressurization, the refueling event may commence, whereupon fuel tank vapors may be routed from the fuel tank to the first fuel vapor canister 222, as indicated by arrows 302. In the example illustration FIG. 3A, it may be appreciated that first thermistor 232a indicates a temperature of the first fuel vapor canister at the position of the first thermistor below the threshold temperature, thus first bypass valve 263a is depicted as being closed and thus no fuel tank vapors may be routed around first fuel vapor canister 222 to second fuel vapor canister 226 via first bypass conduit 265a. Furthermore, as the temperature of the first fuel vapor canister 222 at the position of the first thermistor 232a may be appreciated to be below the threshold, fuel vapors may be effectively adsorbed by the first fuel vapor canister 222, such that gases stripped of fuel vapor may leave the first fuel vapor canister 222 prior to traveling to the second fuel vapor canister 226. As such, a temperature increase may not be indicated via thermistor 232b, thus a second fuel vapor canister loading state may be indicated to comprise an absence of adsorbed fuel tank vapors. Under circumstances wherein the refueling event is completed without a temperature increase above a threshold as indicated by first thermistor 232a, the canister loading state of the first fuel vapor canister 222 may be updated, and a canister purging operation adjusted according to the first fuel vapor canister loading state. In other examples, the canister loading state of both the first fuel vapor canister 222 and the second fuel vapor canister 226 may both be updated even though the first fuel vapor canister was not bypassed, and a canister purge operation adjusted accordingly.

Now turning to FIG. 3B, an example illustration of the evaporative emissions control system 251 as shown in FIG. 3A during a refueling event is depicted wherein the temperature sensed by the first thermistor 232a may be appreciated to be above the threshold temperature. As such, a circuit may be completed based on a temperature dependent change in the resistance of the circuit, thereby opening first bypass valve 263a coupled within first bypass conduit 265a. As such, first bypass valve 263a may be opened without powertrain control module input. The opening of first bypass valve 263a triggered by the first thermistor 232a temperature above a threshold may indicate that the first fuel vapor canister 222 is saturated with fuel tank vapors (e.g., hydrocarbons), and thus if the first fuel vapor canister were not bypassed, the saturation of the first fuel vapor canister 222 may restrict the further flow of fuel tank vapors to the second fuel vapor canister 226, and may lead to premature refueling shutoffs. Via the first thermistor-induced opening of the first bypass valve, fuel tank vapors may be routed around the first fuel vapor canister 222 to the second fuel vapor canister 226 via the first bypass conduit 265a, as indicated by arrows 304. As such, it may be indicated that the first fuel vapor canister 222 is saturated with hydrocarbons, and the second fuel vapor canister loading state may be monitored via the second thermistor 232b for the remaining duration of the refueling event. Subsequent to completion of the refueling event, the second fuel vapor canister loading state may additionally be indicated. As such, under circumstances wherein the refueling event is completed after a temperature increase above a threshold resulted in the routing of fuel tank vapors around the first fuel vapor canister 222 to the second fuel vapor canister 226, the loading state of the first fuel vapor canister 222 and the second fuel vapor canister 226 may be indicated, and a future purging operation adjusted to account for the indicated loading state of the first and second fuel vapor canisters.

Now turning to FIG. 3C an example illustration is shown of an evaporative emissions control system 305 depicting three fuel vapor canisters in series. The components of evaporative emissions control system 305 are the same as those depicted in FIG. 3A-3B (and FIG. 2), with the additional components herein described. For example, evaporative emissions control system 305 further comprises a third fuel vapor canister 229, including a third canister buffer 229a. Housed within third fuel vapor canister 229 is third thermistor 232c. Third fuel vapor canister further comprises a load/purge port 288c, and a vent port 289c. Additionally, a second bypass conduit 265b is shown, wherein one end (e.g., first end) of the second bypass conduit 265b is coupled to vent line 227 at a point between first fuel vapor canister 222 and second fuel vapor canister 226, and wherein the other end (e.g., second end) is coupled to vent line 227 at a point between second fuel vapor canister 226 and third fuel vapor canister 229. Second bypass valve 263b may be housed within second bypass conduit 265b, and may be configured to open and close responsive to thermistor 232b sensing a temperature above a threshold. As such, second thermistor 232b is configured such that, upon a temperature increase above a threshold, a second circuit may be completed based on a temperature dependent change in the resistance of the second circuit, thereby opening the second bypass valve 263b coupled within second bypass conduit 265b. As such, responsive to a temperature increase above a threshold as sensed by first thermistor 232b, second bypass valve 263b may be opened without powertrain control module input. A third thermistor 232c may be further configured to indicate a third fuel vapor canister 229 loading state, but may not be configured to complete another circuit responsive to a sensed temperature increase above a threshold as the evaporative emissions control system 305 illustrated in FIG. 3C does not include a third bypass conduit (or third bypass valve).

An example illustration of the evaporative emissions control system 305 is shown in FIG. 3C depicting a refueling event wherein the temperature sensed by the first thermistor 232a may be appreciated to be above the threshold temperature, and the temperature sensed by the second thermistor 232b may additionally be appreciated to be above another threshold temperature. As such, both the first fuel vapor canister 222 and the second fuel vapor canister 226 may be indicated to be saturated with fuel vapors. Accordingly, first bypass valve 263a, and second bypass valve 263b may be opened, the result of each of the first thermistor 232a and the second thermistor 232b completing respective circuits such that both the first (263a) and second (263b) bypass valves are opened without powertrain control module input. As such, fuel tank vapors are routed around the first fuel vapor canister 222, and the second fuel vapor canister 226, to the load side (load port) of the third fuel vapor canister 229, as indicated by arrows 306. Accordingly, the third fuel vapor canister loading state may be monitored via the third thermistor 232c for the remaining duration of the refueling event. Subsequent to completion of the refueling event, the third fuel vapor canister loading state may additionally be indicated. As such, under circumstances wherein the refueling event is completed and wherein the refueling event resulted in the routing of fuel tank vapors around the first fuel vapor canister 222 and the second fuel vapor canister 226 to the third fuel vapor canister 229, the loading state of all three fuel vapor canisters may be indicated, and one or more parameters of a future purging operation may be adjusted to account for the indicated loading state of the three fuel vapor canisters.

Now turning to FIG. 3D, a typical purging operation for an evaporative emissions control system 251 is illustrated. As previously discussed, components that are the same as those illustrated in FIG. 2 (and FIGS. 3A-3B) are denoted by the same reference number. Subsequent to a refueling event and responsive to canister purge conditions being met (e.g., engine-on with intake manifold vacuum above a threshold), a canister purge valve (e.g., 261) may be commanded open and canister vent valve 297 commanded open or maintained open. In addition, fuel tank isolation valve 252, when included, may be commanded closed. Based on the loading state of the first fuel vapor canister 222 and the second fuel vapor canister 226, the duration and/or aggressiveness of the purging operation may be adjusted accordingly. For example, responsive to both the first fuel vapor canister 222 and the second fuel vapor canister 226 being fully loaded with hydrocarbons, a duration and/or aggressiveness may be increased in order to ensure sufficient purging of the fuel vapor canisters to engine intake. Alternatively, responsive to an indication that neither of the fuel vapor canisters is saturated, the duration and/or aggressiveness may be decreased accordingly. During a purging operation as indicated in FIG. 3D, intake manifold vacuum may be applied to the evaporative emissions control system 251, thus drawing fresh air into vent line 227 through an open canister vent valve, and through second fuel vapor canister 226 and first fuel vapor canister 222, resulting in the desorption of hydrocarbons stored in both fuel vapor canisters enroute to engine intake. Accordingly, if at the start of the purging operation, bypass valve 263a is configured in an open conformation, responsive to the desorption of hydrocarbons from the second fuel vapor canister and the first fuel vapor canister, a cooling effect due to the endothermic process of hydrocarbon desorption from the second fuel vapor canister 226 and the first fuel vapor canister 222 may result in thermistor 232a sensing a temperature below the threshold temperature. As such, the circuit described above with regard to FIG. 3B and FIG. 3D may be opened, thus closing first bypass valve 263a, and thereby resulting in purging of the first fuel vapor canister 222 and the second fuel vapor canister 226 in series. Alternatively, in some examples, bypass valve 263a may have been opened during a prior refueling event, but prior to purging conditions being met, the temperature as sensed by the first thermistor 232a may decrease below the threshold temperature due to a duration of time subsequent to refueling and prior to engine operation. In such circumstances, bypass valve 263a may be closed resulting from the temperature sensed by the first thermistor decreasing below the threshold, such that responsive to a future purging event, the first fuel vapor canister and the second fuel vapor canister may be purged in series.

Now turning to FIG. 4A, a schematic illustration 400 of example circuits comprising first thermistor 232a and second thermistor 232b is shown. Completion of each of the individual circuits, indicated by arrows 403 and 404, may occur responsive to temperature dependent changes in the resistance of the circuits, as described above, wherein completion of the individual circuits may open, for example, a first bypass valve 263a and a second bypass valve 263b. The individual circuits may be powered by any acceptable power source 401 (e.g., 12V). Example circuit 405, illustrated in FIG. 4A may correspondingly control the bypass valve 263a shown in FIG. 4B. Example circuit 406, illustrated in FIG. 4A may correspondingly control bypass valve 263b shown in FIG. 4B. Components that are the same as those indicated in FIG. 3B are denoted by the same reference number, and explained in detail with regard to the evaporative emissions system of FIG. 3B.

Turning to FIG. 5, a flow chart for a high level example method 500, parts of which are carried out by the controller, for conducting a refueling and purging operation is shown. More specifically, method 500 may be used to conduct a refueling event in which premature shutoff events due to loaded fuel vapor canisters may be avoided via the bypassing of one or more loaded fuel vapor canister(s), responsive to an indication that the one or more fuel vapor canister(s) is saturated with hydrocarbons. Additionally, during the refueling event, a canister loading state of the one or more fuel vapor canisters may be monitored and updated such that, responsive to completion of the refueling event, a purging operation may be adjusted to account for the indicated loading state of the one or more fuel vapor canister(s). In this way, method 500 may enable efficient refueling, as fuel vapor canisters loaded with hydrocarbons may be bypassed, thus lowering the resistance to fuel vapor flow, and preventing premature refueling shutoffs. Furthermore, by monitoring the loading state of the one or more fuel vapor canisters during the refueling operation, one or more parameters of purging operations may be adjusted to optimize the process of purging fuel vapors to engine intake during subsequent purging operations. Method 500 will be described with reference to the systems described herein and shown in FIGS. 1-4, though it should be understood that similar methods may be applied to other systems without departing from the scope of this disclosure. Parts of method 500 may be carried out by a controller holding executable instructions in non-transitory memory, such as controller 212 in FIG. 2, while other parts of method 500 may be inherent to the vehicle system, as described in detail below with regard to method 500.

Method 500 begins at 502, carried out by the controller (e.g., 212), and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing at 504, carried out by the controller (e.g., 212), method 500 includes indicating whether a refueling event has been requested. For example, a refueling request may comprise a vehicle operator depression of a refueling button on a vehicle instrument panel in the vehicle (e.g., refueling button 197), or at a refueling door. In some examples, a refueling request may comprise a refueling operator requesting access to a fuel filler neck, for example, by attempting to open a refueling door, and/or attempting to remove a gas cap. If a refueling event has not been requested, the method 500 proceeds to 506, carried out by the controller (e.g., 212), wherein method 500 includes maintaining the status of the fuel system, and may further include maintaining the status of the evaporative emissions system. For example, components such as the FTIV, CVV, CPV, fuel pump, and refueling lock may be signaled by the controller to maintain their current conformation and/or activity. Method 500 may then end.

If a request for refueling is received, method 500 proceeds to 508. At 508, carried out by the controller (e.g., 212), method 500 includes depressurizing the fuel tank. For example, the controller 212 may open a fuel tank isolation valve (such as FTIV 252), when included, and open or maintain open a vent path between the one or more fuel vapor canister(s) and atmosphere (e.g., open CVV), while maintaining a canister purge valve (e.g., CPV 261) closed, to depressurize the fuel tank before allowing enabling fuel to be added therein. The fuel tank isolation valve may be opened in a manner to depressurize the fuel tank at a predetermined rate, so as to prevent rapid depressurization which may cause damage to fuel system components (e.g., FLVV and GVV, which may cork shut due to rapid depressurization). While method 500 depicts a fuel system wherein a fuel tank isolation valve may be configured to open responsive to a refueling request, it should be understood that method 500 may be applied to a vehicle fuel system and evaporative emissions control system wherein a fuel tank isolation valve is not included without departing from the scope of the present disclosure. A refueling lock, such as refueling lock 245, may be maintained locked until the fuel tank pressure decreases to a threshold pressure (e.g., atmospheric pressure), and then commanded to unlock, thus allowing access to the fuel filler neck only following fuel tank depressurization. The fuel tank isolation valve and canister vent path may be maintained open for the duration of the refueling event, to allow refueling vapors to be flowed to the one or more fuel vapor canister(s) as described in further detail below, and to allow gasses stripped of refueling vapors to be flowed to atmosphere.

Continuing at 510, method 500 includes routing fuel tank vapors from the fuel tank to a first fuel vapor canister. At 510 fuel tank vapors may be routed to the first fuel vapor canister as a result of a first bypass valve (e.g., first bypass valve 263a) configured in a closed conformation. The first bypass valve may be in a closed conformation due to a prior drive cycle in which the first fuel vapor canister was purged, for example, and as such, temperature as sensed by a first thermistor (e.g., 232a) may be below a threshold such that a circuit (e.g., 405) is not completed and thus first bypass valve may be maintained closed. It may be appreciated that at 510, routing fuel tank vapors from the fuel tank to the first fuel vapor canister may not require powertrain control module input (subsequent to the opening of the FTIV, if included, and CVV at 508), as the opening/closing of the first bypass valve is dependent on a temperature-dependent change in a resistance of the circuit (e.g., 405).

Continuing at 512, method 500 includes indicating whether the first thermistor temperature is greater than a threshold. For example, the threshold may be a predetermined threshold temperature indicative of the first fuel vapor canister being saturated with hydrocarbons. As one example, first thermistor (e.g., 232a) may be positioned at a vent port of the first fuel vapor canister. At 512, the temperature sensed by the first thermistor may be indicated, and as such a loading state of the first fuel vapor canister may be updated by the powertrain control module. Additionally, the first thermistor may be configured such that a temperature increase above the threshold changes the resistance of the thermistor wherein a circuit (e.g., 405) is completed thereby opening the first bypass valve without powertrain control input. If at 512, the temperature sensed by the first thermistor is below the threshold temperature, method 500 proceeds to 514. At 514, carried out by the controller, method 500 includes indicating whether the refueling event is complete. The end of the refueling event may be indicated based on one or more of the fuel tank pressure and fuel level. For example, the end of the refueling event may be indicated when a fuel level has plateaued for a duration, and/or when a fuel tank pressure begins to decline over the plateau duration. In other examples, the end of the refueling event may be indicated responsive to a refueling nozzle being removed from the fuel filler neck, replacement of a fuel cap, closing of a refueling door, etc. If at 514 it is indicated that the refueling event is not complete, method 500 returns to 510. Alternatively, if at 514 it is indicated that the refueling event is complete, method 500 proceeds to 516, carried out by the controller, and includes updating the first fuel vapor canister loading state based on the temperature sensed by the first thermistor during the course of the refueling event. For example, as the first bypass valve remained closed during the duration of the refueling event due to the temperature sensed by the first thermistor remaining below the threshold, at 516 updating canister loading state may include updating the first fuel vapor canister state and not updating the loading state(s) of the one or more additional fuel vapor canisters configured in the vehicle evaporative emissions control system, as the loading state of the one or more additional fuel vapor canisters may not have changed as a result of the first fuel vapor canister remaining below saturation during the refueling event. However, in other examples, a canister loading state of the three fuel vapor canisters may be updated regardless of whether any one fuel vapor canister was bypassed. Additionally, at 516 if the vehicle is equipped with a fuel tank isolation valve, the valve may be commanded closed after a predetermined pressure in the fuel tank is reached, for example. Returning to 512, if the temperature sensed by the first thermistor is greater than the threshold temperature, method 500 proceeds to 518 and includes opening first bypass valve (e.g., 232*a*). As described above, opening the first bypass valve responsive to the first thermistor sensing a temperature above a threshold may occur without powertrain control module input, as a temperature-dependent change in the resistance of a circuit (e.g., 405) completes the circuit responsive to a temperature increase above the threshold. As such, at 518, method 500 includes routing fuel tank vapors from the fuel tank around the first fuel vapor canister to the load port of the second fuel vapor canister via a first bypass conduit (e.g., first bypass conduit 265*a*).

Proceeding to 520, method 500 includes indicating whether the second thermistor (e.g., 232*b*) temperature is greater than a second threshold. As described above, the threshold may be a predetermined threshold temperature indicative of the second fuel vapor canister being saturated with hydrocarbons. Similar to the first thermistor (e.g., 232*a*), second thermistor (e.g., 232*b*) may be positioned at a vent port of the second fuel vapor canister. At 520, the temperature sensed by the second thermistor may be indicated, and as such a loading state of the second fuel vapor canister may be updated by the powertrain control module. Additionally, the second thermistor may be configured such that a temperature increase above the second threshold changes the resistance of a second circuit (e.g., 406), wherein the second circuit is completed thereby opening a second bypass valve without powertrain control module input. If at 520, the temperature sensed by the second thermistor is below the threshold temperature, method 500 proceeds to 522. At 522, carried out by the controller, method 500 includes indicating whether the refueling event is complete, as described above with regard to 514 of method 500. If at 522 it is indicated that the refueling event is not complete, method 500 returns to 518. Alternatively, if at 522 it is indicated that the refueling event is complete, method 500 proceeds to 516, carried out by the controller, and includes updating the loading state of the first fuel vapor canister and the second fuel vapor canister, based on the temperature sensed by the first thermistor and the second thermistor during the course of the refueling event. For example, as the first bypass valve was opened during the refueling event due to the temperature sensed by the first thermistor reaching the threshold, at 516 updating canister loading state may include updating the first fuel vapor canister state to indicate that the first fuel vapor canister is saturated with hydrocarbons, and updating the loading state of the second fuel vapor canister based on the temperature indicated by the second thermistor. As the second fuel vapor canister remained below the saturation during the refueling event, the second bypass valve thus remained closed, and as a result the loading state of the one or more fuel vapor canisters in addition to the first and second fuel vapor canisters may not be updated, as the loading state of the one or more additional fuel vapor canisters may not have changed during the refueling event. However, in other examples, updating canister loading state may include updating all fuel vapor canisters arranged in the evaporative emissions control system. Furthermore, at 516 if the vehicle is equipped with a fuel tank isolation valve, the valve may be commanded closed after a predetermined pressure in the fuel tank is reached, for example. Returning to 520, if the temperature sensed by the second thermistor is greater than the threshold temperature, method 500 proceeds to 524 and includes opening the second bypass valve (e.g., 232*b*), as described in the example illustration depicted in FIG. 3C. As described above, opening the second bypass valve responsive to the second thermistor sensing a temperature above a threshold may occur without powertrain control module input, as a temperature-dependent change in the resistance of a circuit (e.g., 406) completes the circuit responsive to a temperature increase above the second threshold. As such, at 524, method 500 includes routing fuel tank vapors from the fuel tank around the first fuel vapor canister via the first bypass conduit (e.g., 265*a*) and the second fuel vapor canister via the second bypass conduit (e.g., 265*b*), to a load port of a third fuel vapor canister. In the example method 500 described herein, the evaporative emissions control system is indicated to contain three fuel vapor canisters. However, it should be understood that any number of fuel vapor canisters may be configured as described herein without departing from the scope of the present disclosure. As in the example method 500 depicted herein three fuel vapor canisters are included in the evaporative emissions control system, the third fuel vapor canister may not be bypassed (see for example emissions control system 305 illustrated in FIG. 3B). As such, at 524, during the routing of fuel tank vapors to the third fuel vapor canister, a third thermistor (e.g., 232*c*) may be used to monitor the canister loading state as described above with regard to the first thermistor (e.g., 232*a*) and second thermistor (e.g., 232*b*), however the third thermistor may not be configured to complete a third circuit as described above with regard to the first and second thermistors, as a third bypass valve (and third bypass conduit) is not included in the evaporative emissions control system described herein with regard to method 500.

Proceeding to 526, carried out the by the controller, method 500 includes indicating whether the refueling event is complete, as described above with regard to 514 (and 522) of method 500. If at 526 it is indicated that the refueling event is not complete, method 500 returns to 524. Alternatively, if at 526 it is indicated that the refueling event is complete, method 500 proceeds to 516, carried out by the controller, and includes updating the loading state of the first fuel vapor canister, the second fuel vapor canister, and the third fuel vapor canister, based the temperature sensed by the first thermistor, the second thermistor, and the third thermistor during the course of the refueling event. For example, as described above, as the first bypass valve and the second bypass valve were both opened during the duration of the refueling event due to the temperature sensed by the first thermistor and the second thermistor both reaching their respective threshold temperatures, at 516 updating canister loading state may include updating the first fuel vapor canister state to indicate that the first fuel vapor canister is saturated with hydrocarbons, and updating the second fuel vapor canister state to indicate that the second fuel vapor canister is saturated with hydrocarbons. Additionally, updating canister loading state at 516 may include updating the canister loading state of the third fuel vapor canister based on the temperature sensed by the third thermistor during the course of the refueling event. Furthermore, at 516 if the vehicle is equipped with a fuel tank isolation valve, the valve may be commanded closed after a predetermined pressure in the fuel tank is reached, for example.

Proceeding to 528, carried out by the controller, method 500 includes indicating whether an engine-on event is detected. An engine-on condition may include a condition wherein the vehicle is operating solely by engine combustion, or may additionally include a condition wherein the vehicle may be operating via a combination of engine combustion and battery power (such as hybrid system described in FIG. 1). If at 528 it is determined that the engine is not on, method 500 may proceed to 530. At 530, carried out by the controller, method 500 may include maintaining the fuel system and evaporative emissions control system status. For example, at 530, method 500 may include commanding closed or maintaining closed the CPV, commanding closed or maintaining closed the FTIV, when included, and commanding open or maintaining open the CVV. In some examples, based on the loading state of the one or more fuel vapor canisters responsive to the refueling event, the CVV may be commanded closed or maintained closed to seal the evaporative emissions control system prior to a subsequent purging operation. In alternate examples, including vehicles that are not equipped with an FTIV, the CVV may be commanded open or maintained open to allow for fuel tank vapors to be routed into the one or more fuel vapor canisters. In other examples wherein the vehicle is not equipped with an FTIV, the CVV may alternatively be commanded closed or maintained closed in order to seal the fuel system and evaporative emissions system prior to a subsequent purging operation, and wherein fuel tank pressure may be monitored such that, if fuel tank pressure builds beyond a predetermined threshold during the engine-off event, the CVV may be commanded open to relieve fuel tank pressure.

Proceeding to 532, carried out by the controller, method 500 may include updating the canister loading state of the plurality of fuel vapor canisters to reflect that a canister purge event has not been conducted as a vehicle-on event has not been indicated. Further, at 532, method 500 may include updating a canister purge schedule to reflect that a refueling event has been completed, wherein one or more fuel vapor canisters are loaded with fuel tank vapors to varying degrees, and wherein it may be indicated to purge the one or more fuel vapor canisters at the next engine-on conditions wherein canister purge conditions are met. Method 500 may then end.

Returning to 528, carried out by the controller, if an engine on event is indicated, method 500 proceeds to 534, carried out by the controller, where it is indicated whether canister purging conditions are met. Purge conditions may include an engine-on condition, one or more canister loads above a threshold, an intake manifold vacuum above a threshold, an estimate or measurement of temperature of an emission control device such as a catalyst being above a predetermined temperature associated with catalytic operation commonly referred to as light-off temperature, a non-steady state engine condition, and other operating conditions that would not be adversely affected by a canister purge operation. If at 534 purge conditions are not met, method 500 proceeds to 530 and includes maintaining the fuel system and evaporative emissions control system status as described above. Proceeding to 532, carried out by the controller, method 500 may include updating the canister loading state of the plurality of fuel vapor canisters to reflect that canister purge conditions were not met, and may further include updating a canister purge schedule as described above, to reflect that a purge conditions were not met for a purging operation, and thus it may be indicated to purge the one or more fuel vapor canisters at the next opportunity wherein purge conditions are met. Method 500 may then end.

Returning to 534, if canister purge conditions are met, method 500 proceeds to 536, carried out by the controller, and includes purging the contents of the one or more fuel vapor canisters. For example, purging the contents of the one or more canisters may include commanding open the CPV, commanding open or maintaining open the CVV, and commanding closed or maintaining closed the FTIV (when included). In some examples, commanding open the CPV may include gradually opening the CPV. Commanding open the CPV while concurrently opening or maintaining open the CVV results in engine intake vacuum drawing fresh air into the canister to promote desorption of adsorbed fuel vapor within the one or more fuel vapor canisters, the purge gases routed to engine intake to be combusted. As described above, based on the canister loading state of the one or more fuel vapor canisters housed within the evaporative emissions control system, the duration and/or aggressiveness of the purge operation may be adjusted accordingly, as described in more detail below. Proceeding to 538, carried out by the controller, method 500 includes monitoring the purging operation. For example, at 538, purging the canister may include indicating an air/fuel ratio via, for example, a proportional plus integral feedback controller coupled to a two-state exhaust gas oxygen sensor, and responsive to the air/fuel indication and a measurement of inducted air flow, generating a base fuel command. To compensate for purge vapors, a reference air/fuel ratio, related to engine operation without purging, may be subtracted from the air/fuel ratio indication and the resulting error signal (compensation factor) generated. As such, the compensation factor may represent a learned value directly related to fuel vapor concentration, and may be subtracted from the base fuel command to correct for the induction of fuel vapors. The duration of the purging operation may be based on the learned value (or compensation factor) of the vapors such that when it is indicated there are no appreciable hydrocarbons in the vapors (the compensation is essentially zero), the purge may be ended. Concurrently, the purging process may be additionally monitored by the plurality of thermistors (e.g., first thermistor 232a, second thermistor 232b, third thermistor 232c) to indicate the loading state of the respective fuel vapor canisters. Following purging, method 500 may proceed to 532, carried out by the controller, and may include commanding closed the CPV, updating the loading state of the one or more fuel vapor canisters, and may further include updating a canister purge schedule to indicate the completed canister purge event, etc. Method 500 may then end.

FIG. 6 shows an example timeline for a refueling operation in which loaded fuel vapor canisters are bypassed during a refueling event using methods described herein and with respect to FIG. 5, as applied to the systems described herein and with reference to FIGS. 1-4B. Timeline 600 includes plot 610, indicating whether an engine-on event is detected, and plot 612, indicating whether a refueling event is occurring, over time. Timeline 600 further includes plot 614, indicating a temperature of a first thermistor, positioned at a vent port of a first fuel vapor canister in an evaporative emissions system wherein a plurality of fuel vapor canisters may be arranged in series, as described in detail with regard to FIG. 3C. Line 615 represents a threshold temperature of the fuel vapor canister as sensed by the first thermistor, wherein above the threshold a circuit may be completed that opens a first bypass valve, as described in detail with regard to FIG. 3C. Accordingly, timeline 600 further includes plot 616, indicating an open or closed conformation of the first bypass valve, housed within a first bypass conduit, over time. Timeline 600 further includes plot 618, indicating a temperature of a second thermistor, positioned at a vent port of a second fuel vapor canister. Line 619 represents a second threshold temperature of the second fuel vapor canister as sensed by the second thermistor, wherein above the second threshold a second circuit may be completed that opens a second bypass valve, as described in detail with regard to FIG. 3C. Accordingly, timeline 600 further includes plot 620, indicating the open or closed state of a second bypass valve, housed within a second bypass conduit, over time. Timeline 600 further includes plot 622, indicating a temperature of a third thermistor, positioned at a vent port of a third fuel vapor canister. Line 623 represents a third threshold temperature, as sensed by the third thermistor, wherein above the third threshold it may be indicated that the third fuel vapor canister is saturated, yet a circuit may not be completed as a third bypass valve may not be included in the evaporative emissions system, as described in detail with regard to FIG. 3C. Timeline 600 further includes plot 624, indicating whether a vehicle purging event is occurring, over time.

At time $t_0$ the engine is off, indicated by plot 610. Additionally, a refueling event is not detected, as indicated by plot 612. Accordingly, as a refueling event is not occurring, the temperatures of the first thermistor, indicated by plot 614, the second thermistor, indicated by plot 618, and the third thermistor, indicated by plot 622 are low. As the temperatures of the first and second thermistors are well below the thresholds, represented by lines 615 and 619 respectively, the first bypass valve is closed, indicated by plot 616, and the second bypass valve is closed, indicated by plot 620. Furthermore, as an engine-off event is indicated, a purging event is not occurring, as indicated by plot 624.

At time $t_1$ a refueling event is initiated, as indicated by plot 612. Initiation of a refueling event may comprise a vehicle operator depression of a refueling button on a vehicle instrument panel, or at a refueling door. Initiation of a refueling event may further comprise a refueling operator requesting access to a fuel filler neck by opening a refueling door, or by removing a gas cap. As described above with regard to the method depicted in FIG. 5, subsequent to a refueling initiation (e.g. request for refueling), if the vehicle is equipped with a fuel tank isolation valve (e.g., FTIV 252), the FTIV may be commanded open such that the fuel tank may be depressurized prior to commencing refueling. Accordingly, in the example timeline 600, it may be assumed that the vehicle is equipped with a fuel tank isolation valve, and as such, between time $t_1$ and $t_2$ the fuel tank isolation valve may be commanded open and the fuel tank depressurized. Depressurization of the fuel tank, if a positive pressure was maintained in the tank, may result in fuel vapors from the fuel tank being routed to the first fuel vapor canister, and as such the temperature of the first thermistor may increase slightly. At time $t_2$ fuel delivery to the tank may generate vapors that are routed to the first fuel vapor canister and adsorbed, which may result in a temperature increase in the first fuel vapor canister as monitored by the first thermistor, indicated by plot 614. Between time $t_2$ and $t_3$ temperature in the first fuel vapor canister as sensed by the first thermistor is indicated to rise during the refueling event, and at time $t_3$ the temperature reaches the first threshold. Accordingly, as described above, the temperature reaching the threshold level results in the completion of a first circuit (e.g., 405) due to a temperature dependent change in the resistance of the circuit, wherein the first bypass valve housed within the first bypass conduit is opened without powertrain control module input, as indicated by plot 616.

As the first bypass valve was opened at time $t_3$, fuel tank vapors may be routed from the fuel tank, around the first fuel vapor canister to a second fuel vapor canister, as described in detail above with regard to FIGS. 3A-3C. Accordingly, between time $t_3$ and $t_4$ the temperature of the second fuel vapor canister as sensed by the second thermistor may remain low for some time as fuel vapor routed from the fuel tank to the second canister are adsorbed at the load port (load side) of the second fuel vapor canister.

At time $t_4$ the temperature of the second fuel vapor canister begins to rise, as indicated by plot 618, and at time $t_5$ the temperature sensed by the second thermistor reaches the second threshold. Accordingly, as described above, the temperature reaching the threshold level may result in the completion of a second circuit (e.g., 406) due to a temperature dependent change in the resistance of the second circuit, wherein the second bypass valve housed within the second bypass conduit may be opened without powertrain control module input, as indicated by plot 620.

At time $t_5$, as both the first bypass valve and the second bypass valve have been opened during the refueling event, fuel tank vapors may be routed from the fuel tank around the first fuel vapor canister, and around the second fuel vapor canister, to the third fuel vapor canister, as described above with regard to FIG. 3C. Between time $t_5$ and $t_6$, as refueling is still occurring, temperature in the third fuel vapor canister as sensed by the third thermistor may begin to rise. At time $t_6$ the refueling event may end, as indicated by plot 612. The end of the refueling event may be indicated based on one or more of the fuel tank pressure and fuel level. As described above, the end of the refueling event may be indicated when a fuel level has plateaued for a duration, and/or when a fuel tank pressure begins decreasing over the plateau duration. In other examples, the end of the refueling event may be indicated responsive to a refueling nozzle being removed from the fuel filler neck, replacement of a fuel cap, closing of a refueling door, etc.

At time $t_7$ the engine is turned on, as indicated by plot 610. Accordingly, as a refueling event was just completed, a canister purging operation may be scheduled to clean the fuel vapor canisters of adsorbed hydrocarbons. As such, between time $t_7$ and $t_8$ it may be determined whether conditions are met for a canister purging operation. In the example timeline 600 it may be assumed that between time $t_7$ and $t_8$ it is indicated that canister purge conditions are met. Accordingly, at time $t_8$ a canister purging operation is initiated, as indicated by plot 624. As described above, a canister purging operation may be initiated via the opening of a canister purge valve, commanding closed or maintaining closed a fuel tank isolation valve, if equipped, and commanding open or maintaining open a canister vent valve such that intake manifold vacuum draws fresh air through fuel vapor canisters to desorb fuel vapors, en route to engine intake.

Between time $t_8$ and $t_9$ purging results in fresh air being drawn through the second fuel vapor canister and the first fuel vapor canister. As fresh air desorbs hydrocarbons initially from the second fuel vapor canister, a cooling of the second fuel vapor canister may occur. As a result, at time $t_9$ the temperature as sensed by the second thermistor decreases below the second threshold. Accordingly, the second bypass valve is closed, without powertrain control module input. Similarly, as purging continues between time $t_9$ and $t_{10}$, the temperature of the first fuel vapor canister as sensed by the first thermistor begins to decline, and at time $t_{10}$ the temperature decreases below the first threshold. Accordingly, at time $t_{10}$ the first bypass valve is closed, without powertrain control module input. Between time $t_{10}$ and $t_{11}$, as purging continues, the temperature of the first fuel vapor canister as sensed by the first thermistor and the temperature of the second fuel vapor canister as sensed by the second thermistor continue to decline as fuel vapor are desorbed.

A flow chart for a high-level example method 700 for indicating restrictions in an evaporative emissions system, or a malfunctioning fuel level indicator, responsive to a refueling event, is shown in FIG. 7. More specifically, method 700 may be used to indicate whether a refueling event was ended due to an automatic shutoff event, and if so, depending on whether the tank is indicated to be full and further depending on the temperature of a first fuel vapor canister and a second fuel vapor canister and whether the first and/or second fuel vapor canister(s) were bypassed, indications of restrictions in the evaporative emissions system or a malfunctioning fuel level indicator may be determined. Method 700 will be described with reference to the systems described herein and shown in FIGS. 1-4B, though it should be understood that similar methods may be applied to other systems without departing from the scope of this disclosure. Method 700 may be carried out by a controller, such as controller 212 in FIG. 2, and may be stored at the controller as executable instructions in non-transitory memory.

Method 700 begins at 702 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 704, method 700 includes indicating whether a refueling event has been requested. For example, a refueling request may comprise a vehicle operator depression of a refueling button on a vehicle instrument panel in the vehicle (e.g., refueling button 197), or at a refueling door. In some examples, a refueling request may comprise a refueling operator requesting access to a fuel filler neck, for example, by attempting to open a refueling door, and/or attempting to remove a gas cap. If a refueling event has not been requested, the method 700 proceeds to 706, wherein method 700 includes maintaining the status of the fuel system, and may further include maintaining the status of the evaporative emissions system. For example, components such as the FTIV (when included), CVV, CPV, fuel pump, and refueling lock may be signaled by the controller to maintain their current conformation and/or activity. Method 700 may then end.

If a request for refueling is received, method 700 proceeds to 708. At 708, method 700 includes depressurizing the fuel tank. For example, the controller 212 may open a fuel tank isolation valve (such as FTIV 252), when included, and open or maintain open a vent path between the one or more fuel vapor canisters and atmosphere (e.g., open CVV), while maintaining a canister purge valve (e.g., CPV 261) closed, to depressurize the fuel tank before allowing enabling fuel to be added therein. The fuel tank isolation valve, when included, may be opened in a manner to depressurize the fuel tank at a predetermined rate, so as to prevent rapid depressurization which may cause damage to fuel system components (e.g., FLVV and GVV, which may cork shut due to rapid depressurization). A refueling lock, such as refueling lock 245, may be maintained locked until the fuel tank pressure decreases to a threshold pressure (e.g., atmospheric pressure), and then commanded to unlock, thus allowing access to the fuel filler neck only following fuel tank depressurization. The fuel tank isolation valve and canister vent path may be maintained open for the duration of the refueling event, to allow refueling vapors to be flowed to the fuel vapor canister, and to allow gasses stripped of refueling vapors to be flowed to atmosphere. In alternate examples, including a vehicle that is not equipped with an FTIV, depressurizing the fuel tank prior to refueling may not be conducted, as the tank may already be at atmospheric pressure under circumstances wherein a canister vent valve may be open.

Proceeding to 710, method 700 includes monitoring fuel level, fuel tank pressure, and the temperature of the one or more fuel vapor canisters for the duration of the refueling event. Monitoring fuel level may be conducted via a fuel tank fill level sensor (e.g., 234), monitoring fuel tank pressure (FTP) may be monitored via a fuel tank pressure sensor (e.g., 291), and monitoring the temperature of the one or more fuel vapor canisters may be conducted via one or more thermistors (e.g., first thermistor 232a, second thermistor 232b, third thermistor 232c) each housed within the respective one or more fuel vapor canisters. Monitoring FTP may include receiving signals from one or more fuel tank pressure sensors continuously, or at predetermined time intervals such that a predetermined number of fuel tank pressure measurements can be performed over the duration of the refueling event. The predetermined number of fuel tank pressure measurements and the predetermined time intervals may be set depending on a noise characteristic of the sensor and/or fuel tank pressure signal, for example. In one example, the predetermined time interval may be 5 seconds or 10 seconds, or frequent enough to collect a reliable number of pressure measurements representative of the FTP dynamics typically observed during refueling. As another example, the predetermined time interval or predetermined number of fuel tank pressure measurements may be set large enough to reliably measure a rate of change in fuel tank pressure due to a refueling event. Similarly, monitoring fuel level may include the control system receiving information regarding the level of fuel stored in the fuel tank via one or more fuel level sensors, either continuously or at predetermined intervals over the duration of the refueling event.

One or more thermistors may be configured to monitor the loading state of the one or more fuel vapor canisters, as described in detail above. Briefly, it may be appreciated that the evaporative emissions control system described herein with regard to method 700 may include three fuel vapor canisters arranged as described in FIG. 3C. Each fuel vapor canister may include a thermistor configured to indicate a canister loading state based on the temperature of the respective fuel vapor canister as sensed by the respective thermistor. Furthermore, the first thermistor housed within the first fuel vapor canister, and the second thermistor housed within the second fuel vapor canister may additionally be configured such that, upon a temperature increase above a threshold as sensed by the respective thermistors, a respective circuit may be completed based on a temperature dependent change in the resistance of the circuit, thereby opening a respective bypass valve, described in detail with regard to FIG. 3C.

The end of the refueling event at 710 be indicated based on one or more of the fuel tank pressure and fuel level. For example, the end of the refueling event may be indicated when a fuel level has plateaued for a duration, and when a fuel tank pressure begins to decrease over the plateau duration. In other examples, the end of the refueling event may be indicated responsive to a refueling nozzle being removed from the fuel filler neck, replacement of a fuel cap, closing of a refueling door, etc. In vehicles equipped with an FTIV, the FTIV may be commanded closed subsequent to the end of the refueling event to seal the fuel tank.

Proceeding to 712, method 700 includes indicating whether the refueling event was terminated by an automatic shut-off event. An automatic shut-off event may be indicated by a controller, such as controller 212, and may be based on fuel tank fill level, fuel tank pressure, etc. For example, a fuel tank pressure above a threshold may trigger an automatic shutoff of the refueling pump. A float valve may be coupled to a fill limit vent valve, and may be configured to close the valve when the fuel level reaches a threshold. The closing of the FLVV may restrict fuel vapor from entering the evap recovery line (e.g., 231), and may thus generate a threshold pressure within the fuel tank. Automatic shut-off events may also be triggered due to a restriction in the evap recovery lines, canister vent line, etc. Additionally, a saturated fuel vapor canister or canisters may restrict the flow of fuel vapor thus triggering automatic shutoffs if not bypassed, as described herein. A refueling event may include multiple automatic shutoff events. For example, a refueling nozzle that includes on-board vapor recovery may automatically shut off if the refueling nozzle is not coupled to the fuel filler neck properly. Further, if a refueling operator trickle fills the fuel tank following a first automatic shutoff event, an additional automatic shutoff event may occur.

If no automatic shutoff was detected, (refueling has ended as indicated by, for example, a stabilization of fuel level, removal of fuel nozzle from fuel neck, etc., method 700 may proceed to 714 and may include maintaining fuel system and evaporative emissions system status for a duration until a vehicle-on event is detected. For example, if the vehicle is equipped with an FTIV, the FTIV may be maintained closed. Additionally, a CPV may be maintained in a closed confirmation, and a CVV may be maintained in an open conformation. Alternatively, in some examples, the CVV may be commanded closed or maintained closed. As no automatic shutoff was detected, a restriction in fuel system and/or evaporative emissions system may not be indicated, and no indication of fuel system/evaporative emissions system malfunction may be indicated. However, as refueling was ended without an automatic shutoff, restrictions and/or malfunction in the fuel system/evaporative emissions system may not be conclusively ruled out. As such, at 714, maintaining fuel system and evaporative emissions system status may include indicating that a refueling event has occurred and that refueling was ended prior to automatic shutoff, thus a flag may be set at the controller to perform additional diagnostic tests to verify that the fuel system and/or evaporative emissions system is functioning properly. Method 700 may then end.

Returning to 712, if the refueling event was terminated via one or more automatic shutoff events, method 700 proceeds to 716 and includes indicating whether the fuel tank is full. If at 716 the fuel level in the fuel tank is determined to be greater than or equal to 100% of fuel tank capacity at the time of the automatic shutoff event, method 700 may proceed to 718. As the fuel tank was filled to capacity resulting in an automatic shutoff, at 718, method 700 may include indicating an absence of restrictions in the fuel system and/or evaporative emissions system. Method 700 may then end.

Returning to 716, if it is indicated that the refueling event was terminated responsive to one or more automatic shutoff events, yet the fuel tank is not full, method 700 proceeds to 720 and includes indicating whether the first fuel vapor canister was bypassed during the refueling event. At 720, indicating whether the first fuel vapor canister was bypassed during the refueling event may include indicating whether the first bypass valve was opened, for example. If at 720 it is indicated that the first fuel vapor canister was not bypassed, method 700 proceeds to 722 and includes indicating whether the first fuel vapor canister temperature as monitored by the first thermistor (positioned at the vent port of the first fuel vapor canister) reached a threshold temperature. If at 722 it is indicated that the threshold temperature was reached, yet the first fuel vapor canister was not bypassed, method 700 proceeds to 726 and includes indicating one or more of thermistor circuitry malfunction and/or bypass valve malfunction. As one example, the first bypass valve may have become stuck such that completing the circuit responsive to a temperature dependent change in the circuit resistance no longer triggers the opening of the first bypass valve. Alternatively, first bypass valve may be intact, yet the circuitry wherein the first bypass valve may be opened may be malfunctioning. As the first fuel vapor canister was indicated to be saturated with fuel vapor, as indicated by the temperature as monitored by the first thermistor, yet the first fuel vapor canister was not bypassed, the automatic shutoff event may be attributed to an increased resistance to fuel vapor flow during the refueling event responsive to the saturation level of the first fuel vapor canister. As such, method 700 may proceed to 728 and includes updating the emissions system status to indicate first thermistor circuitry malfunction and/or first bypass valve malfunction. At 728, updating the emissions system status to indicate first thermistor circuitry malfunction and/or first bypass valve malfunction may include setting a flag at the controller and may further include triggering a malfunction indicator light to notify the vehicle operator of evaporative emissions system malfunction. Furthermore, at 728, method 700 may include updating a canister loading state to indicate that the first fuel vapor canister is full, and may include updating a canister purge schedule such that a purging operation may be indicated at the next opportunity wherein canister purging conditions are met. Method 700 may then end.

Returning to 722, if it is indicated that the first fuel vapor canister temperature as monitored by the first thermistor did not reach a threshold temperature, method 700 may proceed to 724. At 724, method 700 may include indicating a restriction in the fuel system/evaporative emissions system. As an automatic shutoff event was indicated prior to the tank reaching a full fuel level, yet the canister was not bypassed and it was indicated that the temperature of the canister did not reach a threshold temperature, at 724, method 700 may include indicating a restriction in the evaporative emissions system. Indicating a restriction in the evaporative emissions system may include setting a flag at the controller. Proceeding to 728, method 700 may include updating the status of the emissions control system. For example, updating the status of the emissions control system at 728 may include updating the loading state of the first fuel vapor canister responsive to the refueling event. Updating the emissions control system at 728 may further include illuminating a malfunction indicator light to alert a vehicle operator of a restriction in the evaporative emissions system, such that the vehicle operator may be notified that the vehicle needs to be serviced. In other examples, updating the emissions control system at 728 may include suspending a canister purging operation due to the indicated restriction. Method 700 may then end.

Returning to 720, if it was indicated that the first fuel vapor canister was bypassed, method 700 may proceed to 730 wherein it may be determined whether the second fuel vapor canister was bypassed. At 730, indicating whether the second fuel vapor canister was bypassed during the refueling event may include indicating whether the second bypass valve was opened, for example. If at 730 it is indicated that the second fuel vapor canister was bypassed, method 700 may proceed to 732. At 732, method 700 may include indicating on-board tests to determine how the fuel level indicator is operating. For example, as the first and the second canister were both bypassed, and one or more automatic shutoffs were detected, the fuel tank may be full yet the fuel level in the tank may be indicated to be less than full as a result of malfunction of the fuel level indicator. As such an on-board test to determine how the fuel level indicator is operating may include analyzing fuel tank pressure data during the refueling event, and the fuel level data to determine whether the automatic shutoff was the result of a malfunctioning fuel level indicator. Method 700 may then proceed to 734 where the status of the evaporative emissions system and fuel system may be updated. For example, at 734, method 700 may include updating the canister loading state of the first fuel vapor canister and the second fuel vapor canister, to indicate that the first fuel vapor canister and the second fuel vapor canister are fully loaded. At 734, method 700 may additionally include updating the loading state of the third fuel vapor canister. Furthermore, at 734, method 700 may include updating an operating status of the fuel level indicator, updating a dashboard fuel gage, updating fuel level based parameters such as miles-to-empty, and updating a canister purge schedule. Finally, if the results of an on-board test to determine how the fuel level indicator is operating indicate that the fuel level indicator is functioning properly, then updating emissions system status at 734 may include indicating that the cause of the automatic shutoff may be the result of the third fuel vapor canister contributing to resistance to fuel vapor flow, depending on the loading state of the third fuel vapor canister. Method 700 may then end.

Returning to 730, if it was indicated that the second fuel vapor canister was not bypassed, method 700 may proceed to 736 where it may be determined whether the second fuel vapor canister temperature reached a threshold temperature as monitored by the second thermistor (positioned at the vent port of the second fuel vapor canister). If at 736 it is indicated that the threshold temperature was reached, yet the second fuel vapor canister was not bypassed, method 700 may proceed to 740 and may include indicating one or more of thermistor circuitry malfunction and/or bypass valve malfunction. As described above, in one example, the second bypass valve may have become stuck such that completing the circuit responsive to a temperature dependent change in the circuit resistance no longer triggers the opening of the second bypass valve. Alternatively, the second bypass valve may be intact, yet the circuitry wherein the second bypass valve may be opened may be malfunctioning. As the second fuel vapor canister was indicated to be saturated with fuel vapor, as indicated by the temperature as monitored by the second thermistor, yet the second fuel vapor canister was not bypassed, the automatic shutoff event may be attributed to an increased resistance to fuel vapor flow during the refueling event responsive to the saturation level of the second fuel vapor canister. As such, method 700 may proceed to 734 and may include updating the emissions system status to indicate second thermistor circuitry malfunction and/or second bypass valve malfunction. At 734, updating the emissions system status to indicate second thermistor circuitry malfunction and/or second bypass valve malfunction may include setting a flag at the controller and may further include triggering a malfunction indicator light to notify the vehicle operator of evaporative emissions system malfunction. Furthermore, at 734, method 700 may include updating a canister loading state to indicate that the first fuel vapor canister is full, and that the second fuel vapor canister is full, and may additionally include updating a canister purge schedule such that a purging operation may be indicated at the next opportunity wherein canister purging conditions are met. In some examples, the duration and/or aggressiveness of a subsequent purging operation may be updated according to the loading state of the first fuel vapor canister and the second fuel vapor canister. Method 700 may then end.

Returning to 736, if it was indicated that the second fuel vapor canister as monitored by the second thermistor did not reach a threshold temperature, method 700 may proceed to 738. At 738, as an automatic shutoff event was indicated prior to the tank reaching a full fuel level, yet the second canister was not bypassed and it was indicated that the temperature of the second fuel vapor canister did not reach a threshold temperature, at 738, method 700 may include indicating a restriction in the evaporative emissions system. Indicating a restriction in the evaporative emissions system may include setting a flag at the controller. Proceeding to 734, method 700 may include updating the status of the emissions control system. For example, updating the status of the emissions control system at 734 may include updating the loading state of the first fuel vapor canister to indicate that the first fuel vapor canister is saturated, and may further include updating the loading state of the second fuel vapor canister responsive to the refueling event. Updating the emissions control system at 734 may further include illuminating a malfunction indicator light to alert a vehicle operator of a restriction in the evaporative emissions system, such that the vehicle operator may be notified that the vehicle needs to be serviced. Furthermore, updating the emissions system status at 7434 may include suspending a canister purging operation, the result of an indicated restriction in the evaporative emissions system. Method 700 may then end.

FIG. 8 shows an example timeline 800 for determining whether there is a restriction in a fuel system/evaporative emissions system, subsequent to a refueling operation using methods described herein and with respect to FIG. 7, as applied to the systems described herein and with reference to FIGS. 1-4. Timeline 800 includes plot 810, indicating whether a refueling event is occurring, over time. Timeline 800 further includes plot 812, indicating the open or closed status of a fuel tank isolation valve, and plot 814, indicating a fuel tank pressure, as monitored by a fuel tank pressure transducer (e.g., 291), over time. It may be appreciated that, while timeline 800 includes an FTIV, an FTIV may not be included in the vehicle without departing from the scope of the present disclosure. Line 815 represents the fuel tank at atmospheric pressure. Timeline 800 further includes plot 816, indicating a fuel tank fill level, as monitored by a fuel level indicator (e.g., 234), over time. Line 817 represents a fuel tank fill level wherein the fuel tank is full (e.g., filled to capacity). Timeline 800 further includes plot 818, indicating a first fuel vapor canister temperature, as monitored by a first thermistor positioned at a vent port of the first fuel vapor canister, over time. Line 819 represents a threshold, above which indicates that the first fuel vapor canister is saturated with hydrocarbons, and wherein reaching the threshold completes a first circuit such that a first bypass valve housed within a first bypass conduit is opened to route fuel tank vapors around the first fuel vapor canister. Accordingly, timeline 800 further includes plot 820, indicating the open or closed status of a first bypass valve, over time. Timeline 800 further includes plot 822, indicating a second fuel vapor canister temperature, as monitored by a second thermistor positioned at a vent port of the second fuel vapor canister, over time. Line 823 represents a second threshold, above which indicates that the second fuel vapor canister is saturated with hydrocarbons, and wherein reaching the second threshold completes a second circuit such that a second bypass valve housed within a second bypass conduit is opened to route fuel tank vapors around the second fuel vapor canister. Accordingly, timeline 800 further includes plot 824, indicating the open or closed status of a second bypass valve, over time. Timeline 800 further includes plot 826, indicating a third fuel vapor canister temperature, as monitored by a third thermistor positioned at a vent port of the third fuel vapor canister, over time. Timeline 800 further includes plot 828, indicating whether an automatic shutoff of a refueling event has occurred, over time. Timeline 800 further includes plot 830, indicating whether restrictions in the evaporative emissions system are detected, over time.

At time $t_0$ a refueling request has not yet been received, indicated by plot 810, and the FTIV is closed, indicated by plot 812. As the FTIV is closed, the fuel tank is holding a pressure slightly above atmospheric pressure, indicated by plot 814. The fuel tank is empty, indicated by plot 816. The first fuel vapor canister temperature is low, as measured by the first thermistor, indicated by plot 818. As such, the first canister bypass valve, indicated by plot 820, is closed. Additionally, second fuel vapor canister temperature is low, as measured by the second thermistor, indicated by plot 822. As such, the second canister bypass valve, indicated by plot 824, is closed. The temperature of the third fuel vapor canister is low, as measured by the third thermistor, indicated by plot 826. No automatic shutoff event is detected, indicated by plot 828, and no restrictions in the evaporative emissions system are detected, indicated by plot 830.

At time $t_1$ a request for refueling is received. Accordingly, at time $t_2$ the FTIV is commanded open to relieve pressure in the fuel tank. Between time $t_2$ and $t_3$, pressure in the fuel tank decreases to atmospheric pressure. At time $t_3$, refueling of the vehicle commences. Accordingly, between time $t_3$ and $t_4$ pressure in the fuel tank rises and plateaus, and fuel level in the tank rises. As the first bypass valve is closed, fuel vapors generated during the refueling event are routed to the first fuel vapor canister. As such, the temperature of the first fuel vapor canister increases between time $t_3$ and $t_4$ as monitored by the first thermistor positioned at the vent port of the first fuel vapor canister. At time $t_4$ the temperature sensed by the first thermistor reaches a first threshold level. As the temperature sensed by the first thermistor has reached a threshold level, a temperature-dependent change in the resistance of a first circuit (e.g., 405) is such that the first canister bypass valve is opened, thus routing fuel vapors from the fuel tank around the first fuel vapor canister to the second fuel vapor canister. Between time $t_4$ and $t_5$, as fuel vapors are routed directly to the second fuel vapor canister, the temperature of the second fuel vapor canister as monitored by the second thermistor positioned at the vent port of the second fuel vapor canister rises but does not reach a threshold level. Accordingly, the second bypass valve remains closed, and as such, the second fuel vapor canister is not bypassed. As the second fuel vapor canister is not bypassed, the temperature of the third fuel vapor canister, as monitored by the third thermistor positioned at the vent port of the third fuel vapor canister, remains low.

At time $t_5$ approaching the full fill level causes the fuel tank pressure to begin to rise. Accordingly, between time $t_5$ and $t_6$ fuel tank pressure sharply increases (e.g., due to a float valve closing a fill limit vent valve), and at time $t_6$ the rise in fuel tank pressure causes an automatic shut-off signal to be sent to the dispenser. Accordingly, the fuel dispenser is shut off and fuel dispensing ceases. As such, between time $t_6$ and time $t_7$, fuel tank pressure is observed to decrease. At time $t_7$ pressure in the fuel tank reaches atmospheric pressure, and accordingly, at time $t_7$ the FTIV is commanded closed. As the automatic shutoff event was indicated to be due to a fuel tank being filled to capacity, no restrictions in the evaporative emissions system are indicated, as indicated by plot 830. Additionally, as the automatic shutoff event was indicated to be due to a fuel tank being full, it may be indicated that the fuel level indicator is functioning properly. However, if it was determined that the automatic shutoff event was not due to the fuel tank being full, an indication of a restriction in the evaporative emissions system, or a malfunctioning fuel level indicator may be determined according to the method described with regard to FIG. 7.

At time $t_8$, the refueling event is ended, as indicated by plot 810. The refueling event may be ended, for example, by replacement of a fuel cap. As the refueling event is ended and no restrictions in the evaporative emissions system are indicated, the indication of an automatic shutoff may be reset such that future refueling events may be conducted as described with regard to the method of FIG. 7.

Between time $t_8$ and $t_9$, temperature of the first fuel vapor canister, indicated by plot 818, remains above a threshold, thus the first bypass valve remains open as the temperature-dependent circuit controlling the open or closed state of the first bypass valve is still completed. Additionally, the temperature of the second fuel vapor canister, indicated by plot 822, remains below another threshold, thus the second bypass valve remains closed as the temperature-dependent circuit controlling the open or closed state of the second bypass valve is not completed. Subsequent to the refueling event, at the next engine-on event a canister purging operation may be conducted responsive to canister purge conditions being met (not shown in the timeline of FIG. 8).

In this way, for an evaporative emissions system (fuel vapor storage system) comprising a plurality of fuel vapor canisters arranged in series, during refueling, fuel vapors may be routed to a first fuel vapor canister, and upon indication that the first fuel vapor canister is saturated, fuel vapors may be routed around the first fuel vapor canister to another fuel vapor canister such that restrictions to fuel vapor flow resulting from saturated fuel vapor canisters are avoided, thus reducing the likelihood of premature shutoffs of a refueling dispenser.

In one example, routing fuel vapors around a saturated fuel vapor canister may include completing a circuit based on a temperature dependent change in the resistance of the circuit as monitored by a thermistor positioned in the fuel vapor canister at a vent port, wherein completion of the circuit triggers the opening of a bypass valve housed within a bypass conduit running parallel to the saturated fuel vapor canister.

The technical effect of bypassing saturated fuel vapor canisters during a refueling operation is to enable the bypassing passively without input from the powertrain control module. As such, restrictions to fuel vapor flow resulting from saturated fuel vapor canisters may be reduced, resulting in a reduction of premature shutoffs of a refueling dispenser during a refueling operation. Furthermore, as the bypassing of saturated fuel vapor canisters is achieved passively without input from the powertrain control module, costs and complexity of the fuel vapor storage system may be reduced.

The systems described herein and with reference to FIGS. 1-4B, along with the method described herein and with reference to FIG. 5 and FIG. 7 may enable one or more systems and one or more methods. In one example, a method comprises during refueling a fuel tank which supplies fuel to an engine, venting the fuel tank to atmosphere through a vapor storage system comprising first and second fuel vapor canisters in series; routing vapors from the fuel tank to the first fuel vapor canister; and responsive to saturation of the first fuel vapor canister: routing vapors from the fuel tank around the first fuel vapor canister to the second fuel vapor canister. In a first example of the method, the method further comprises monitoring a first fuel vapor canister temperature via a first thermistor positioned at a first vent port of the first fuel vapor canister, wherein saturation of the first fuel vapor canister is indicated with an indication, the indication that the first fuel vapor canister is saturated with fuel vapors includes the first fuel vapor canister temperature above a predetermined threshold temperature, and where the routing includes routing vapors directly from the fuel tank completely around the first fuel vapor canister and directly to the second fuel vapor canister. A second example of the method optionally includes the first example and further comprises powering a circuit via an on-board power source; and completing the circuit responsive to the first fuel vapor canister temperature above the predetermined threshold temperature, wherein the engine is an engine of a road vehicle. A third example of the method optionally includes any one or more or each of the first and second examples and further includes wherein completing the circuit is based on a temperature dependent change in a resistance of the circuit. A fourth example of the method optionally includes any one or more or each of the first through third examples and further comprises coupling and uncoupling the fuel tank to the second fuel vapor canister via a first bypass valve, the first bypass valve housed within a first bypass conduit running parallel to the first fuel vapor canister; and wherein routing vapors from the fuel tank around the first fuel vapor canister to the second fuel vapor canister further comprises opening the first bypass valve. A fifth example of the method optionally includes any one or more or each of the first through fourth examples and further includes wherein the first bypass valve is opened responsive to completing the circuit when the first fuel vapor canister temperature is above the predetermined threshold temperature; and wherein the first bypass valve is maintained open responsive to the first fuel vapor canister temperature above the predetermined threshold temperature being maintained, and maintained closed responsive to the first fuel vapor canister temperature below the predetermined threshold temperature. A sixth example of the method optionally includes any one or more or each of the first through fifth examples and further includes wherein refueling a tank comprises one or more automatic shutoffs of a refueling dispenser. A seventh example of the method optionally includes any one or more or each of the first through sixth examples and further comprises indicating a tank fill level by a fuel level indicator housed within the tank; indicating whether the tank fill level is at capacity responsive to one or more automatic shutoffs of the refueling dispenser during refueling; and responsive to determining that the tank fill level is at capacity, indicating an absence of restrictions in the vapor storage system. An eighth example of the method optionally includes any one or more or each of the first through seventh examples and further includes wherein responsive to an indication that the fuel tank is not full and that fuel vapors were not routed from the fuel tank around the first fuel vapor canister to the second fuel vapor canister; indicating a restriction in the vapor storage system responsive to the first fuel vapor canister temperature below a predetermined threshold during refueling; and indicating malfunction in one or more of the first thermistor and the first bypass valve responsive to the first fuel vapor canister temperature above a predetermined threshold during refueling. A ninth example of the method optionally includes any one or more or each of the first through eighth examples and further includes wherein routing vapors from the fuel tank around the first fuel vapor canister to the second fuel vapor canister and routing vapors from the fuel tank to the first fuel vapor canister is achieved passively without powertrain control module input. A tenth example of the method optionally includes any one or more or each of the first through ninth examples and further comprises monitoring a second fuel vapor canister temperature via a second thermistor positioned at a second vent port of the second fuel vapor canister, wherein monitoring the first fuel vapor canister temperature and the second fuel vapor canister temperature includes indicating a first fuel vapor canister loading state and a second fuel vapor canister loading state; and responsive to completion of refueling: updating the first fuel vapor canister loading state and the second fuel vapor canister loading state to indicate an updated loading state of the first fuel vapor canister and the second fuel vapor canister. An eleventh example of the method optionally includes any one or more or each of the first through tenth examples and further comprises selectively coupling a first purge port of the first fuel vapor canister and a second load port of the second fuel vapor canister to an intake manifold of the engine through a canister purge valve; selectively coupling the first vent port of the first fuel vapor canister and a second vent port of the second fuel vapor canister to atmosphere through a canister vent valve; and purging fuel vapors stored in a vapor adsorbent, which is housed in each of the first fuel vapor canister and the second fuel vapor canister into the intake manifold of the engine under predetermined engine operating conditions; purging fuel vapors further comprising: commanding open the canister purge valve and commanding open or maintaining open the canister vent valve to direct air through the vapor storage system to the intake manifold of the engine to purge the vapor storage system and fuel vapor canister of hydrocarbons. A twelfth example of the method optionally includes any one or more or each of the first through eleventh examples and further comprises adjusting one or more fuel vapor purging parameters based on the updated loading state of the first fuel vapor canister and the second fuel vapor canister.

Another example of a method comprises during refueling a fuel tank which supplies fuel to an engine, venting the fuel tank to atmosphere through a vapor storage system comprising a first fuel vapor canister and a second fuel vapor canister arranged in series, each comprising a load port, a vent port, and a purge port; routing vapors from the fuel tank to the load port of a first fuel vapor canister; monitoring a first fuel vapor canister temperature via a first thermistor positioned at the vent port of the first fuel vapor canister and monitoring a second fuel vapor canister temperature via a second thermistor positioned at the vent port of the second fuel vapor canister; and responsive to an indication that the first fuel vapor canister temperature is above a predetermined threshold: routing vapors from the fuel tank around the first fuel vapor canister to the load port of a second fuel vapor canister. In a first example of the method, the method includes wherein adsorption of fuel tank vapors by the first fuel vapor canister and the second fuel vapor canister results in an increase in temperature, whereby a first fuel vapor canister loading state and a second fuel vapor canister loading state may be indicated based on the first fuel vapor canister temperature and the second fuel vapor canister temperature indicated during refueling; and wherein the first fuel vapor canister loading state and the second fuel vapor canister loading state is updated after completion of refueling to indicate an updated first fuel vapor canister loading state and second fuel vapor canister loading state. A second example of the method optionally includes the first example and further comprises purging fuel vapors stored in a vapor adsorbent, which is housed in each of the first fuel vapor canister and the second fuel vapor canister into the engine to be used as fuel under predetermined engine operating conditions; and adjusting a fuel vapor purging duration based on the updated first fuel vapor canister loading state and second fuel vapor canister loading state after completion of refueling. A third example of the method optionally includes any one or more or each of the first and second examples and further comprises coupling and uncoupling the fuel tank to the load port of the second fuel vapor canister via a first bypass valve, the first bypass valve housed within a first bypass conduit running parallel to the first fuel vapor canister; powering a circuit via a suitable on-board power source, wherein the circuit is completed responsive to the first fuel vapor canister above a predetermined threshold and based on a temperature dependent change in a resistance of the circuit; and wherein completion of the circuit opens the first bypass valve such that routing fuel tank vapors around the first fuel vapor canister to the second fuel vapor canister via the first bypass conduit is achieved passively without powertrain control module input. A fourth example of the method optionally includes any one or more or each of the first through third examples and further comprises indicating a one or more automatic shutoff(s) of a refueling dispenser during refueling; indicating a tank fill level by a fuel level indicator housed within the fuel tank; indicating whether the fuel tank is full responsive to the one or more automatic shutoffs of the refueling dispenser during refueling; and responsive to an indication that the fuel tank is not full and that fuel vapors were not routed from the fuel tank around the first fuel vapor canister to the second fuel vapor canister: indicating a vapor storage system restriction responsive to the first fuel vapor canister temperature below the predetermined threshold during refueling; and indicating malfunction in one or more of the first thermistor and the first bypass valve responsive to the first fuel vapor canister temperature above the predetermined threshold during refueling.

An example of a system for a vehicle comprises a fuel tank; a first fuel vapor canister comprising a first load port, a first vent port, and a first purge port; a second fuel vapor canister comprising a second load port, and a second vent port; a vapor conduit, coupling the fuel tank to the first load port of the first fuel vapor canister; a first segment of a vent line, coupling the first vent port of the first fuel vapor canister to the second load port of the second fuel vapor canister; a second segment of the vent line, coupling the second vent port of the second fuel vapor canister to atmosphere via a canister vent valve; a first bypass conduit, coupling the fuel tank to the first segment of the vent line via a first bypass valve at a point between the first vent port of the first fuel vapor canister and the second load port of the second fuel vapor canister; a first thermistor positioned at the first vent port of the first fuel vapor canister; a second thermistor positioned at the second vent port of the second fuel vapor canister; a circuit, powered by an on-board power supply and comprising the first thermistor, the first thermistor further comprising a temperature-dependent variable resistor, the first thermistor in series with the first bypass valve; a canister purge valve, coupled between the first purge port of the first fuel vapor canister and an engine intake manifold; and a controller storing instructions in non-transitory memory, that when executed, cause the controller to: receive a request for refueling; monitor a first fuel vapor canister temperature via the first thermistor and monitor a second fuel vapor canister temperature via the second thermistor during refueling; and responsive to completion of refueling: update a loading state of the first fuel vapor canister and the second fuel vapor canister to indicate an updated loading state of the first fuel vapor canister and the second fuel vapor canister based on the first fuel vapor canister temperature and the second fuel vapor canister temperature during refueling. In a first example, the system further includes wherein the controller further stores instructions in non-transitory memory, that when executed, cause the controller to: open the canister vent valve and open the canister purge valve to direct air flow through the second fuel vapor canister and the first fuel vapor canister, out of the first purge port of the first fuel vapor canister to the engine intake manifold to purge fuel vapors stored in the first fuel vapor canister and the second fuel vapor canister to the engine intake manifold; and responsive to completion of refueling: adjust one or more parameters for purging the first fuel vapor canister and the second fuel vapor canister based on the updated loading state of the first fuel vapor canister and the second fuel vapor canister.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   during refueling a fuel tank which supplies fuel to an engine, venting the fuel tank to atmosphere through a vapor storage system comprising first and second fuel vapor canisters in series;
   routing vapors from the fuel tank to the first fuel vapor canister; and
   responsive to a temperature of the first fuel vapor canister above a predetermined threshold:
      routing vapors from the fuel tank around the first fuel vapor canister to the second fuel vapor canister.

2. The method of claim 1, further comprising:
   monitoring the first fuel vapor canister temperature via a first thermistor positioned at a first vent port of the first fuel vapor canister, where the routing includes routing vapors directly from the fuel tank completely around the first fuel vapor canister and directly to the second fuel vapor canister; and
   wherein the temperature of the first fuel vapor canister above the predetermined threshold indicates that the first fuel vapor canister is saturated with fuel vapor.

3. The method of claim 2, further comprising:
   powering a circuit that includes the first thermistor via an on-board power source; and
   completing the circuit responsive to the first fuel vapor canister temperature above the predetermined threshold, wherein the engine is an engine of a road vehicle.

4. The method of claim 3, wherein completing the circuit is based on a temperature dependent change in a resistance of the circuit.

5. The method of claim 3, further comprising:
   coupling and uncoupling the fuel tank to the second fuel vapor canister via a first bypass valve, the first bypass valve housed within a first bypass conduit running parallel to the first fuel vapor canister; and
   wherein routing vapors from the fuel tank around the first fuel vapor canister to the second fuel vapor canister further comprises opening the first bypass valve.

6. The method of claim 5, wherein the first bypass valve is opened responsive to completing the circuit when the first fuel vapor canister temperature is above the predetermined threshold; and
   wherein the first bypass valve is maintained open responsive to the first fuel vapor canister temperature above the predetermined threshold being maintained, and maintained closed responsive to the first fuel vapor canister temperature below the predetermined threshold.

7. The method of claim 2, further comprising:
   indicating one or more automatic shut-offs of a refueling dispenser during the refueling the fuel tank.

8. The method of claim 7, further comprising:
   indicating a tank fill level via a fuel level indicator housed within the fuel tank;
   indicating whether the tank fill level is at capacity responsive to one or more automatic shutoffs of the refueling dispenser during refueling; and
   responsive to determining that the tank fill level is at capacity, indicating an absence of restrictions in the vapor storage system.

9. The method of claim 8, wherein responsive to an indication that one or more automatic shutoffs occurred during the refueling, and further responsive to an indication that the fuel tank is not full and that fuel vapors were not routed from the fuel tank around the first fuel vapor canister to the second fuel vapor canister:
   indicating a restriction in the vapor storage system responsive to the first fuel vapor canister temperature below the predetermined threshold during refueling; and
   indicating malfunction in one or more of the first thermistor and/or a first bypass valve responsive to the first fuel vapor canister temperature above the predetermined threshold during refueling.

10. The method of claim 1, wherein routing vapors from the fuel tank around the first fuel vapor canister to the second fuel vapor canister and routing vapors from the fuel tank to the first fuel vapor canister is achieved passively without powertrain control module input.

11. The method of claim 2, further comprising:
   monitoring a second fuel vapor canister temperature via a second thermistor positioned at a second vent port of the second fuel vapor canister, wherein monitoring the first fuel vapor canister temperature and the second fuel vapor canister temperature includes indicating a first fuel vapor canister loading state and a second fuel vapor canister loading state; and
   responsive to completion of refueling:
      updating the first fuel vapor canister loading state and the second fuel vapor canister loading state to indicate an updated loading state of the first fuel vapor canister and the second fuel vapor canister.

12. The method of claim 11, further comprising:
   selectively coupling a first purge port of the first fuel vapor canister and a second load port of the second fuel vapor canister to an intake manifold of the engine through a canister purge valve;

selectively coupling the first vent port of the first fuel vapor canister and a second vent port of the second fuel vapor canister to atmosphere through a canister vent valve; and purging fuel vapors stored in a vapor adsorbent, which is housed in each of the first fuel vapor canister and the second fuel vapor canister, into the intake manifold of the engine under predetermined engine operating conditions;

purging fuel vapors further comprising: commanding open the canister purge valve and commanding open or maintaining open the canister vent valve to direct air through the vapor storage system to the intake manifold of the engine to purge the vapor storage system and fuel vapor canister of hydrocarbons.

13. The method of claim 12, further comprising:
adjusting one or more fuel vapor purging parameters based on the updated loading state of the first fuel vapor canister and the second fuel vapor canister.

14. A method comprising:
during refueling a fuel tank which supplies fuel to an engine, venting the fuel tank to atmosphere through a vapor storage system comprising a first fuel vapor canister and a second fuel vapor canister arranged in series, each comprising a load port, a vent port, and a purge port;
routing vapors from the fuel tank to the load port of the first fuel vapor canister;
monitoring a first fuel vapor canister temperature via a first thermistor positioned at the vent port of the first fuel vapor canister and monitoring a second fuel vapor canister temperature via a second thermistor positioned at the vent port of the second fuel vapor canister; and
responsive to an indication that the first fuel vapor canister temperature is above a predetermined threshold:
routing vapors from the fuel tank around the first fuel vapor canister to the load port of the second fuel vapor canister.

15. The method of claim 14,
wherein adsorption of fuel tank vapors by the first fuel vapor canister and the second fuel vapor canister results in an increase in temperature, whereby a first fuel vapor canister loading state and a second fuel vapor canister loading state may be indicated based on the first fuel vapor canister temperature and the second fuel vapor canister temperature indicated during refueling; and
wherein the first fuel vapor canister loading state and the second fuel vapor canister loading state is updated after completion of refueling to indicate an updated first fuel vapor canister loading state and second fuel vapor canister loading state.

16. The method of claim 15, further comprising:
purging fuel vapors stored in a vapor adsorbent, which is housed in each of the first fuel vapor canister and the second fuel vapor canister into the engine to be used as fuel under predetermined engine operating conditions; and
adjusting a fuel vapor purging duration based on the updated first fuel vapor canister loading state and second fuel vapor canister loading state after completion of refueling.

17. The method of claim 14, further comprising:
coupling and uncoupling the fuel tank to the load port of the second fuel vapor canister via a first bypass valve, the first bypass valve housed within a first bypass conduit running parallel to the first fuel vapor canister;

powering a circuit via a suitable on-board power source, wherein the circuit is completed responsive to the first fuel vapor canister above a predetermined threshold and based on a temperature dependent change in a resistance of the circuit; and wherein completion of the circuit opens the first bypass valve such that routing fuel tank vapors around the first fuel vapor canister to the second fuel vapor canister via the first bypass conduit is achieved passively without powertrain control module input.

18. The method of claim 17, further comprising:
indicating one or more automatic shutoff(s) of a refueling dispenser during refueling;
indicating a tank fill level by a fuel level indicator housed within the fuel tank;
indicating whether the fuel tank is full responsive to the one or more automatic shutoffs of the refueling dispenser during refueling; and
responsive to an indication that the fuel tank is not full and that fuel vapors were not routed from the fuel tank around the first fuel vapor canister to the second fuel vapor canister:
indicating a vapor storage system restriction responsive to the first fuel vapor canister temperature below the predetermined threshold during refueling; and
indicating malfunction in one or more of the first thermistor and the first bypass valve responsive to the first fuel vapor canister temperature above the predetermined threshold during refueling.

19. A vehicle system, comprising:
a fuel tank;
a first fuel vapor canister comprising a first load port, a first vent port, and a first purge port;
a second fuel vapor canister comprising a second load port and a second vent port;
a vapor conduit, coupling the fuel tank to the first load port of the first fuel vapor canister;
a first segment of a vent line, coupling the first vent port of the first fuel vapor canister to the second load port of the second fuel vapor canister;
a second segment of the vent line, coupling the second vent port of the second fuel vapor canister to atmosphere via a canister vent valve;
a first bypass conduit, coupling the fuel tank to the first segment of the vent line via a first bypass valve at a point between the first vent port of the first fuel vapor canister and the second load port of the second fuel vapor canister;
a first thermistor positioned at the first vent port of the first fuel vapor canister;
a second thermistor positioned at the second vent port of the second fuel vapor canister;
a circuit, powered by an on-board power supply and comprising the first thermistor, the first thermistor further comprising a temperature-dependent variable resistor, the first thermistor in series with the first bypass valve;
a canister purge valve, coupled between the first purge port of the first fuel vapor canister and an engine intake manifold; and
a controller storing instructions in non-transitory memory, that when executed, cause the controller to:
receive a request for refueling;
monitor a first fuel vapor canister temperature via the first thermistor and monitor a second fuel vapor canister temperature via the second thermistor during refueling; and responsive to completion of refueling:
    update a loading state of the first fuel vapor canister and the second fuel vapor canister to indicate an updated loading state of the first fuel vapor canister and the second fuel vapor canister based on the first fuel vapor canister temperature and the second fuel vapor canister temperature during refueling.

20. The vehicle system of claim 19, wherein the controller further stores instructions in non-transitory memory, that when executed, cause the controller to:
    open the canister vent valve and open the canister purge valve to direct air flow through the second fuel vapor canister and the first fuel vapor canister, out of the first purge port of the first fuel vapor canister to the engine intake manifold to purge fuel vapors stored in the first fuel vapor canister and the second fuel vapor canister to the engine intake manifold; and
    responsive to completion of refueling:
        adjust one or more parameters for purging the first fuel vapor canister and the second fuel vapor canister based on the updated loading state of the first fuel vapor canister and the second fuel vapor canister.

* * * * *